(12) United States Patent
Abramov

(10) Patent No.: US 8,221,514 B2
(45) Date of Patent: Jul. 17, 2012

(54) ECOLOGICALLY CLEAN METHOD AND APPARATUS FOR WATER HARVESTING FROM AIR

(75) Inventor: Yuri Abramov, Holon (IL)

(73) Assignee: Yuri Abramov, Holon (IL)

( * ) Notice: Subject to any disclaimer, the term of this patent is extended or adjusted under 35 U.S.C. 154(b) by 225 days.

(21) Appl. No.: 12/854,196

(22) Filed: Aug. 11, 2010

(65) Prior Publication Data

US 2010/0319308 A1    Dec. 23, 2010

Related U.S. Application Data

(63) Continuation-in-part of application No. 12/774,936, filed on May 6, 2010, and a continuation-in-part of application No. 12/775,264, filed on May 6, 2010.

(60) Provisional application No. 61/175,799, filed on May 6, 2009, provisional application No. 61/233,207, filed on Aug. 12, 2009.

(51) Int. Cl.
*B01D 45/00* (2006.01)

(52) U.S. Cl. .............. 55/342; 55/440; 55/418; 55/434; 416/223 R; 62/271; 62/93; 62/150; 95/113; 95/117; 95/118; 95/119; 95/120; 96/125; 96/127

(58) Field of Classification Search .............. 55/342, 55/440, 418, 434; 62/271, 93, 150; 95/113, 95/117–120, 126; 96/125, 127
See application file for complete search history.

(56) References Cited

U.S. PATENT DOCUMENTS

| | | | | |
|---|---|---|---|---|
| 2,682,925 A * | 7/1954 | Wosika | ................. | 416/226 |
| 3,199,268 A * | 8/1965 | Oehlrich et al. | ................. | 96/372 |
| 4,073,601 A * | 2/1978 | Kress | ................. | 416/242 |
| 5,151,014 A * | 9/1992 | Greenwald et al. | ................. | 416/237 |
| 5,588,804 A * | 12/1996 | Neely et al. | ................. | 416/223 R |
| 5,624,234 A * | 4/1997 | Neely et al. | ................. | 416/238 |
| 6,076,364 A | 6/2000 | Stripp | | |
| 7,162,833 B2 | 1/2007 | Faris | | |
| 7,404,837 B2 | 7/2008 | Killion | | |
| 7,472,550 B2 | 1/2009 | Lear, Jr. | | |
| 7,775,063 B2 | 8/2010 | Thompson | | |
| 2005/0091916 A1 | 5/2005 | Faris | | |

(Continued)

OTHER PUBLICATIONS

J. D. Jacob, Associate Professor, "Encyclopedia of Fluid Mechanics", —Department of Mechanical Engineering, University of Kentucky, Lexington, KY 40506-0108, jdjacob@uky.edu, version 0.1, crunched on Mar. 18, 2003; downloaded from the internet on Dec. 12, 2009.

*Primary Examiner* — Jason M Greene
*Assistant Examiner* — Dung H Bui

(57) ABSTRACT

The invention provides an ecologically clean method and apparatus for water harvesting from air. The method is based on changing of thermodynamic state properties of air wind getting a rotation and passing through convergent-divergent nozzles. The apparatus is a water condensation engine exposed to humid wind. The constructive solution has no moving solid parts, and the incoming wind is an inherent moving component of the engine. It comprises a cascade of sequentially arranged horn-tubes and a set of stationary wing-like details. Those horn-tubes transform the wind into a fast and cooled out-flowing air flux coming-and-hitting upon the set of wing-like details, where the air portions are accelerated and eddying. The inner static pressure and temperature decrease in the air portions. The decrease in static pressure and temperature triggers off condensation of water-vapors into water-aerosols.

26 Claims, 16 Drawing Sheets

U.S. PATENT DOCUMENTS

| | | |
|---|---|---|
| 2005/0105970 A1 | 5/2005 | Faris |
| 2005/0223719 A1 | 10/2005 | Killion |
| 2008/0178625 A1 | 7/2008 | Thompson |
| 2009/0049763 A1 | 2/2009 | Blundell |

* cited by examiner

Fig. 2

| Temp. of air | Relative humidity => | 50% | 60% | 70% | 80% | 90% | 100% |
|---|---|---|---|---|---|---|---|
| 50 °C | Absolute humidity, g/m³ | 41.5 | 49.8 | 58.1 | 66.4 | 74.7 | 83 |
| | Dew point temperature | 36 °C | 40 °C | 43 °C | 45 °C | 48 °C | 50 °C |
| 45 °C | Absolute humidity, g/m³ | 32.7 | 39.3 | 45.8 | 52.4 | 58.9 | 65.4 |
| | Dew point temperature | 32 °C | 36 °C | 38 °C | 41 °C | 43 °C | 45 °C |
| 40 °C | Absolute humidity, g/m³ | 25.6 | 30.7 | 35.8 | 40.9 | 46 | 51.1 |
| | Dew point temperature | 27 °C | 30 °C | 33 °C | 36 °C | 38 °C | 40 °C |
| 35 °C | Absolute humidity, g/m³ | 19.8 | 23.8 | 27.7 | 31.7 | 35.6 | 39.6 |
| | Dew point temperature | 21 °C | 25 °C | 28 °C | 31 °C | 33 °C | 35 °C |
| 30 °C | Absolute humidity, g/m³ | 15.2 | 18.2 | 21.3 | 24.3 | 27.3 | 30.4 |
| | Dew point temperature | 18 °C | 21 °C | 24 °C | 26 °C | 28 °C | 30 °C |
| 25 °C | Absolute humidity, g/m³ | 11.5 | 13.8 | 16.1 | 18.4 | 20.7 | 23 |
| | Dew point temperature | 13 °C | 16 °C | 19 °C | 21 °C | 23 °C | 25 °C |
| 20 °C | Absolute humidity, g/m³ | 8.7 | 10.4 | 12.1 | 13.8 | 15.6 | 17.3 |
| | Dew point temperature | 9 °C | 12 °C | 14 °C | 16 °C | 18 °C | 20 °C |
| 15 °C | Absolute humidity, g/m³ | 6.4 | 7.7 | 9 | 10.3 | 11.5 | 12.8 |
| | Dew point temperature | 4 °C | 7 °C | 9 °C | 11 °C | 13 °C | 15 °C |
| 10 °C | Absolute humidity, g/m³ | 4.7 | 5.6 | 6.6 | 7.5 | 8.5 | 9.4 |
| | Dew point temperature | 0 °C | 1 °C | 4 °C | 6 °C | 8 °C | 10 °C |

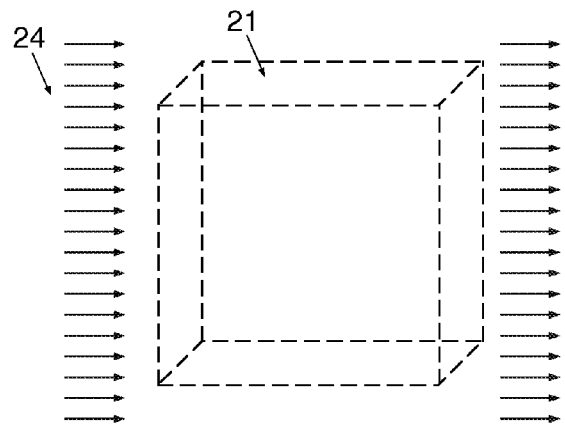

Fig. 2a

ECOLOGICALLY CLEAN METHOD AND APPARATUS FOR WATER HARVESTING FROM AIR

CROSS REFERENCE TO RELATED APPLICATIONS

This application claims priority to U.S. application Ser. No. 12/774,936 filed on or around May 06, 2010, and to U.S. application Ser. No. 12/775,264 filed on or around May 6, 2010 and to U.S. provisional application 61/233,207 filed on or around Aug. 12, 2009. Furthermore, this application claims priority under the Paris convention to U.S. application Ser. No. 12/774,936 filed on or around May 6, 2010 and to U.S. application Ser. No. 12/775,264 filed on or around May 6, 2010 and to U.S. provisional application 61/233,207 filed on or around Aug. 12, 2009. In addition, this application is a continuation-in-part of application Ser. No. 12/774,936, filed on or around May 6, 2010, which is based upon and claims the benefit of U.S. Provisional Application No. 61/175,799 filed on or around May 6, 2009, and U.S. Provisional Application No. 61/233,207 filed on or around Aug. 12, 2009. In addition, this application is a continuation-in-part of application Ser. No. 12/775,264, filed on or around May 6, 2010, which is based upon and claims the benefit of U.S. Provisional Application No. 61/175,799 filed on or around May 6, 2009, and U.S. Provisional Application No. 61/233,207 filed on or around Aug. 12, 2009.

FIELD OF THE INVENTION

The invention relates generally to ecologically clean technology, and, more particularly, to extraction of distilled water from humid air.

BACKGROUND OF THE INVENTION

In most geographic areas prior art water sources are placed far from the actual utilization point. In such cases, the ability to extract water from air offers a substantial advantage, because there is no need to transport the water from a distant source to a local storage facility. Moreover, if water is continuously harvested, local water reserve requirements are greatly reduced.

Another reason for water-from-air extraction is in those regions of the world where sources of potable water are scarce or absent.

An exemplary situation is when a massive forest fire needs to be extinguished, and typically great expense is incurred for an airplane to supply an enormous amount of water to the scene of action. In this case the ability to trigger substantial rainfall would be highly desirable.

Another important application is an ecologically clean method for solar thermal energy collection with focusing plates, for example, in the form of parabolic troughs, wherein the total area of all the plates is as big as possible. On the one hand, it is preferable that the focusing plates are clean from dust. On the other hand, normally, the system occupies a big area in an open space, where natural dust always covers the plates, thereby reducing the efficiency of solar energy collection. The problem of cleaning the plates might be solved by repeated washings with distilled water.

Sometimes an effect of air saturated with water is unwanted, as for example, in plant growing incubators, where a desired high air temperature results in unwanted air saturation.

Given the ubiquitous nature of water in the vapor phase, it is possible to establish a sustainable water supply at virtually any location having air being refreshed, if one can develop a technology that efficiently harvests water from air.

Possession of such technology will provide a clear logistical advantage to supply agriculture, industry and townspeople with water and to control ecological conditions.

For example, a water production unit, which uses a desiccant wheel for extracting water from an air loop, where a portion of the air loop is heated using exhaust from, for example, a vehicle to regenerate the desiccant wheel, is described in U.S. Pat. No. 7,251,945 "Water-from-air system using desiccant wheel and exhaust" by Stephen Tongue. The method described assumes thermal energy consumption, and the suggested apparatus comprises moving parts of the mechanism.

Another method for extracting water from air is described by Spletzer, in three U.S. Pats. No. 6,360,549—Method and apparatus for extracting water from air; U.S. Pat. No. 6,453,684—Method and apparatus for extracting water from air; and U.S. Pat. No. 6,511,525—Method and apparatus for extracting water from air using a desiccant. The method is described as four steps: (1) adsorbing water from air into a desiccant, (2) isolating the water-laden desiccant from the air source, (3) desorbing water as vapor from the desiccant into a chamber, and (4) isolating the desiccant from the chamber, and compressing the vapor in the chamber to form a liquid condensate. The described method assumes electrical energy consumption, and the suggested apparatus comprises moving parts.

In both of the above approaches there is a need for energy consumption and mechanisms comprising moving parts, thereby requiring a degree of maintenance of the systems. This makes the water harvesting neither reliable nor inexpensive. Moreover, the fuel or electrical energy consumption renders these prior art methods unclean ecologically.

Yet another method and apparatus for atmospheric water collection is described in U.S. Pat. No. 7,343,754, "Device for collecting atmospheric water" by Ritchey. This method is based on moist air convection due to the temperature difference between air and ground. However, such slow convection does not allow for producing industrial amounts of water.

U.S. Pat. No. 6,960,243, "Production of drinking water from air" by Smith, et al, describes an adsorption-based method and apparatus, where the adsorption process is modified to reduce heating energy consumption. However, the adsorption method is also intended for producing small quantities of water.

The water condensation process is an exothermal process. I.e., when water is transformed from vapors to aerosols and/or dew, so-called latent-heat is released, thereby heating the aerosols and/or dew drops themselves, as well as the surroundings. The pre-heated aerosols and/or dew drops subsequently evaporate back to gaseous form, thereby slowing down the desired condensation process.

To moisturize and clean eye-glasses, one breathes out a portion of warm and humid air through widely opened mouth, while a blowing through a tiny hole between folded lips is substantially less efficient for the moisturizing.

FIG. 1 is a schematic drawing of a classical prior art profile of an airplane wing 10. It is well-known that there is a lift-effect of the airplane wing 10, which is a result of the non-symmetrical profile of wing 10. An oncoming air stream 12 flows around the non-symmetrical profile of wing 10, drawing forward the adjacent air due to air viscosity, according to the so-called Coanda-effect. The axis 11 of wing 10 is defined as separating the upper and lower fluxes. Axis 11 of wing 10 and the horizontal direction of the oncoming air flux 12 constitute a so-called "attack angle" 13. Firstly, a lifting-force is defined by attack angle 13, which redirects the flowing wind. Secondly, when attack angle 13 is equal to zero, wing 10, having an ideally streamlined contour, provides that the upper air flux 14 and the lower air flux 15 meet behind wing 10. Upper air flux 14 and lower air flux 15, flowing around wing 10, incur changes their cross-section areas and are accelerated convectively according to the continuity principle: pSv=Const, where p is the density of flux; v is the flux velocity, and S is the flux cross-section area. As a result, upper air flux 14, covering a longer way, runs faster, than lower flux 15. According to Bernoulli's principle, this results in less so-called static pressure on wing 10 from upper flux 14 than the static pressure from the lower flux 15. If upper flux 14 and lower flux 15 flow around wing 10 laminary, the difference of the static pressures is defined as $$\Delta P = C\rho \frac{v^2}{2},$$

where ΔP is the static pressure difference defining the lifting force when attack angle 13 is equal to zero, C is the coefficient, depending on wing 10's non-symmetrical profile, p is the density of the air; and v is the velocity of the air flux relatively to wing 10. In practice, there are also turbulences and vortices of the fluxes, which are not shown here. The general flowing, turbulences and vortices result in air static pressure distribution, particularly, in local static pressure reduction and local extensions of the flowing air. Considering a certain portion of air flowing around wing 10, and referring to the Klapeiron-Mendeleev law concerning a so-called hypothetic ideal gas state:

$$\frac{PV}{T} = nR,$$

where n is the molar quantity of the considered portion of the gas, P is the gas static pressure, V is the volume of the gas portion, T is the absolute temperature of the gas, and R is the gas constant, there are at least two reasons for changes in the gas state parameters of the air portion flowing around wing 10. First, for relatively slow wind, when the flowing air can be considered as incompressible gas, Gay-Lussac's law for isochoric process bonds the static pressure P with absolute temperature T by the equation $$\frac{\Delta P}{P} = \frac{\Delta T}{T},$$

i.e. reduced static pressure is accompanied with proportional absolute temperature decreasing ΔT. Second, for wind at higher speeds, running on a non-zero attack angle 13, when the air becomes compressible-extendable, the wind flowing around wing 10 performs work W for the air portion volume extension, wherein the volume extension process is substantially adiabatic. The adiabatic extension results in a change of the portion of gas internal energy, accompanied with static pressure reduction and temperature decrease. The work performed W of the wind flowing around wing 10 for the adiabatic process is defined as: $W=nC_V \Delta T_a$, where $C_V$ is the heat capacity for an isochoric process, and $\Delta T_a$ is the adiabatic temperature decrease of the considered air portion. The value of the adiabatic temperature decrease $\Delta T_a = T_2 - T_1$ is bonded with static pressure reduction by the relation: $T_2/T_1 = (P_2/P_1)^{(\gamma-1)/\gamma}$, where $P_1$ and $P_2$ are static pressures of the considered air portion before and after the considered adiabatic process correspondingly, and γ is an adiabatic parameter, which depends on molecular structure of gas, and the value γ=7/5 is a good approximation for nature air. Local cooling by both mentioned processes: isochoric and adiabatic pressure reduction, acts in particular, as a water condensation trigger. Moreover, if the wind flows around a wing with a velocity equal to or higher than the Mach number, i.e. the speed of sound, a well-known phenomenon of shock sound emission takes place. This shock wave is not caused by wing vibration, but it is at the expense of the internal energy of the air flow, that results in an air temperature shock decrease and thereby, provokes the process of vapor condensation into water-aerosols. For example, as is shown schematically in FIG. 1a, considerable amounts of water-vapor condense into water-aerosols 17 and sublimate into micro-flakes-of-snow 18, which are observed behind the high-speed aircraft's 16 wings.

Reference is now made to prior art FIG. 1b, a schematic illustration of a convergent-divergent nozzle 100, also known as the De Laval nozzle, and graphics of distribution of two parameters of gas 101: velocity 150 and static pressure 160 along the length of nozzle 100. A standard rocket nozzle can be modeled as a cylinder 140 that leads to a constriction 141, known as the "throat", which leads into a widening "exhaust bell" 142 open at the end. High speed, and therefore compressible-extendable hot gas 101 flows through throat 141, where the velocity picks up 151 and the pressure falls 161. Hot gas 101 exits throat 141 and enters the widening exhaust bell 142. It expands rapidly, and this expansion drives the velocity up 152, while the pressure continues to fall 162. The gas absolute temperature distribution along the length of nozzle 100 (not shown here) is similar to the static pressure distribution 160.

FIG. 2 is a prior art table showing figures for weather conditions near the ground and how much water is in the air. Each cell 22 of the table comprises two numbers: upper and lower. The upper numbers show the "absolute humidity" in g/m³, i.e. how many grams of water-vapors are in one cubic meter (1 m³) of air. The lower numbers show so-called "dew-point" temperature of the air in ° C. For example, at the air temperature of 35° C. and relative humidity of 70%, the absolute humidity is 27.7 g/m³ and the dew-point temperature is 28° C.

FIG. 2a is a prior art schematic representation of a breeze flux 24, crossing through a cube 21 of space, having all the dimensions of 1 m. If, for example, the breeze velocity is given as v=5 m/sec, thereby, considering the described humidity conditions, each second (27.7×5=138.5) gram of water-vapors cross through space cube 21. This means that approximately ½ ton of water-vapors crosses space cube 21 per hour.

FIG. 3a is a prior art schematic illustration of a well-known "vortex tube", also known as the Ranque-Hilsch vortex tube. It is a mechanical device 300 that separates a compressed gas 310 into hot 311 and cold 312 streams. It has no moving parts. Pressurized gas 310 is injected tangentially into a swirl chamber 313 and accelerates to a high rate of rotation. Due to a conical nozzle 314 at the end of the tube 315, only the outer shell of the rotated gas 316 is allowed to escape at the butt-end outlet 317. As a result this portion 311 of the gas is found to have been heated. The remainder of gas 316, which performs an inner vortex of reduced diameter within the outer vortex, is forced to exit through another outlet 318. As a result this portion 312 of the gas is found to have been cooled.

FIG. 3b is a simplified exemplary prior art schematic illustration of the phenomenon of atmospheric tornados arising. If viscous air streams 32 and 33, having equal velocities at their propagation fronts, meet at an angle of almost 180°, friction between contacting parts of viscous air streams 32 and 33 results in re-distribution of air streams 32 and 33 fronts' velocities, as shown schematically by arrows 34 and 35. The re-distributed velocities redirect the fronts such that portions of air move angularly, as it is shown schematically by circulating arrows 36, and the two air streams 32 and 33 suck portions of each other according to the Coanda-effect. In addition, fresh portions of air streams 32 and 33 make new portions of the circulating vortex in the same space. Such a positive feedback loop may create local tornados having a high spin rate, wherein outer rotating air portions, which are speeding faster, suck new portions of air according to Bernoulli's principle and the Coanda-effect, and there is an inherent relative vacuum near the air rotation center. The portions of the rotating air at the same time can move vertically, so air portions move helically-vertical. A tornado is not necessarily visible; however, the intense low pressure, caused by the high wind speeds and rapid rotation, usually causes water-vapor in the air to condense into a visible condensation funnel. Thus, a phenomenon is observed that quickly circulating air triggers condensation of vapor molecules into water-aerosols. It may happen even if there are no dew-point conditions for water condensation in the nearest surroundings of the tornado. There are at least two mechanisms for triggering water condensation. One mechanism is explained by the fact that circulating air has inherent pressure distribution, wherein inner pressure is lower and outer pressure is higher. An air portion, which is entrapped by the high spin tornado, is convectively accelerated and adiabatically decompressed by the cyclone. Static pressure is reduced due to both the convective acceleration and adiabatically. The static pressure reduction is accompanied with a decrease in air portion temperature. The air cooling provokes the water vapors to condense into aerosols. Another trigger for water condensation derives from the fact that quickly revolving air, accompanied inherently by friction between the moving moist air parts, causes the phenomenon of water-vapor molecules ionization. The ionized molecules become the centers for condensing water polar molecules into easily visible aerosols.

There is therefore a need in the art for a system to provide an effective and ecologically clean mechanism for controlled water harvesting from air. Wind energy has historically been used directly to propel sailing ships or conversion into mechanical energy for pumping water or grinding grain. The principal application of wind power today is the generation of electricity. There is therefore a need in the art for a system to provide an effective mechanism for water harvesting from air utilizing nature wind power.

SUMMARY OF THE INVENTION

Accordingly, it is a principal object of the present invention to overcome the limitations of existing apparatuses for extracting water from air, and to provide improved methods and apparatus for extracting water from air.

It is a further object of the present invention to provide methods and apparatus for more reliable water harvesting.

It is still a further object of the present invention to provide methods and apparatus for ecologically clean harvesting of water, where the forced water condensation from humid air is fulfilled by an engine powered by natural wind.

It is yet another object of the present invention to provide methods and apparatus for a more robust constructive solution without moving parts, where the incoming wind is the only moving component of an engine.

It is a following object of the present invention to provide methods and apparatus powered by natural wind for blowing around and cooling objects.

It is one more object of the present invention to provide methods and apparatus for improvement of flying properties of an aircraft.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

All the above and other characteristics and advantages of the invention will be further understood through the following illustrative and non-limitative description of preferred embodiments thereof.

BRIEF DESCRIPTION OF THE DRAWINGS

In order to understand the invention and to see how it may be carried out in practice, a preferred embodiment will now be described, by way of a non-limiting example only, with reference to the accompanying drawings, in the drawings:

FIG. 2 is a prior art table-chart, showing weather conditions and how much water-vapors is in air;

FIG. 2a is a prior art schematic representation of a breeze flux crossing through a cube of space;

DETAILED DESCRIPTION OF PREFERRED EMBODIMENTS

The principles and operation of a method and an apparatus according to the present invention may be better understood with reference to the drawings and the accompanying description, it being understood that these drawings are given for illustrative purposes only and are not meant to be limiting.

Figure 1:
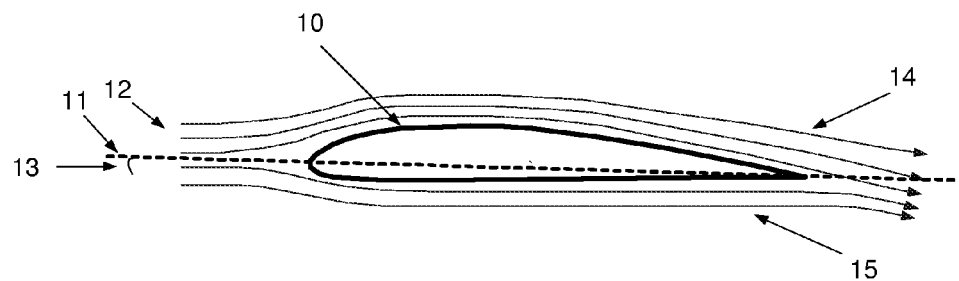
FIG. 1 is a schematic drawing of a classic prior art profile of an airplane wing.
Figure 1A:
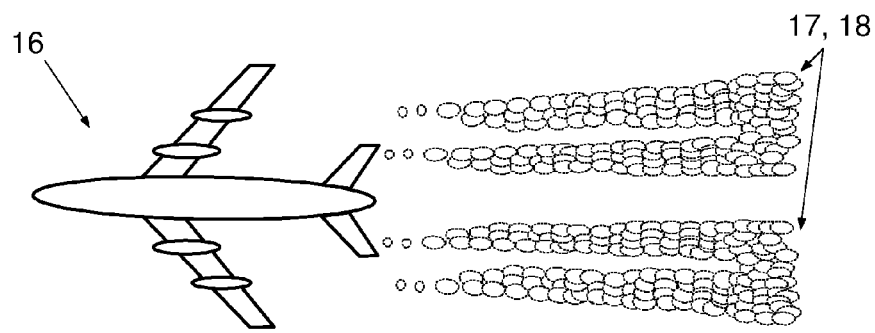
FIG. 1a is a prior art schematic illustration of condensing water-aerosols and sublimated micro-flakes-of-snow behind the wings of high-speed aircraft.
Figure 1B:
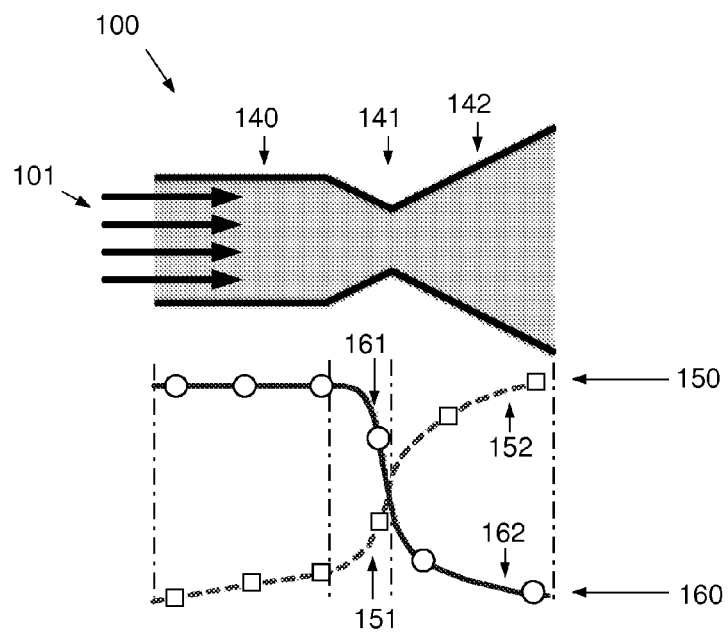
FIG. 1b is a prior art schematic illustration of a convergent-divergent nozzle and graphics of gas velocity and static pressure distributions along the nozzle length.
Figure 3A:
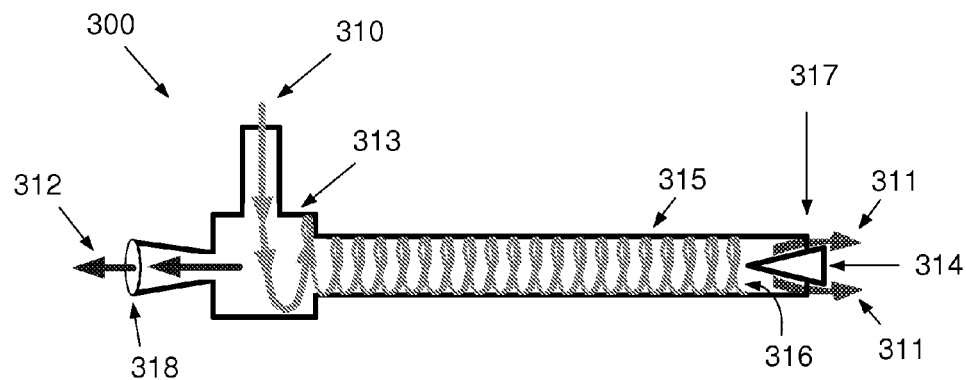
FIG. 3a is a prior art schematic illustration of the Ranque-Hilsch vortex tube.
Figure 3B:
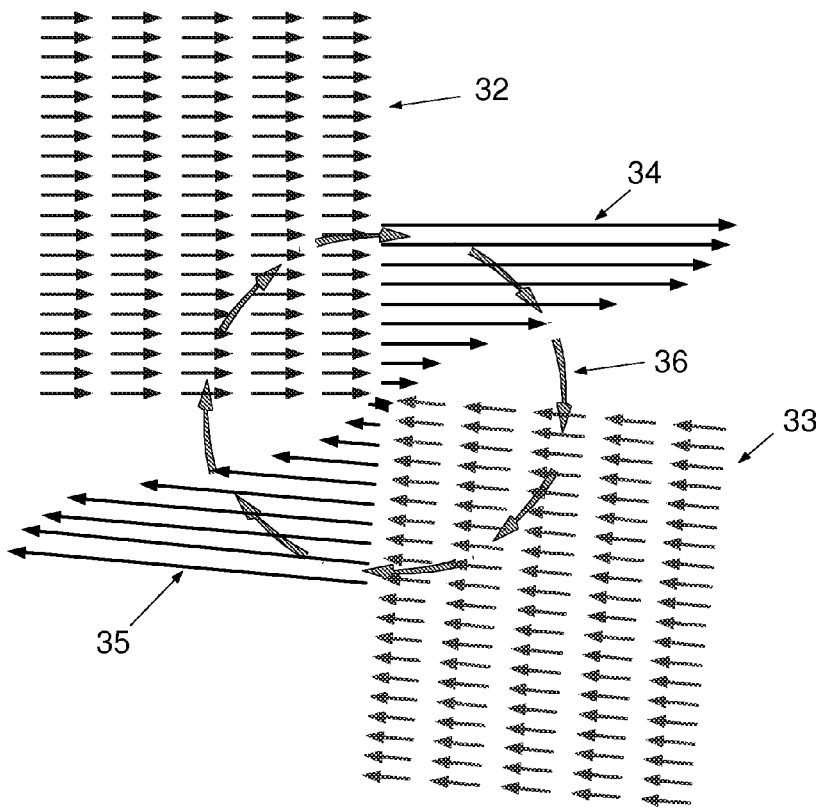
FIG. 3b is an exemplary prior art schematic illustration of a phenomenon of atmospheric tornados arising.
Figure 4:
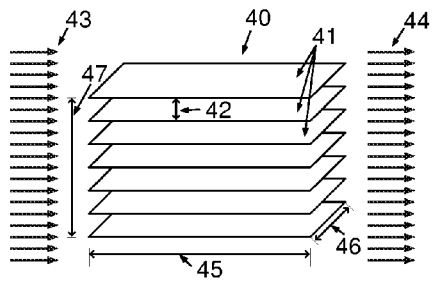
FIG. 4 is a schematic representation of a trivial passive catcher of water aerosols.

FIG. 4 is a schematic representation of a trivial passive catcher 40 of water aerosols. Catcher 40 has plates 41 for accumulation of naturally condensed dew. The plates 41 have length L 45, width w 46 and are distanced at intervals 42. The total height of passive catcher 40 is h 47. When catcher 40 is placed in an open space, humid windy air 43 crosses though the free space intervals 42 between plates 41. If weather conditions are such that humid windy air 43 comprises water aerosols, drops of dew arise on the surfaces of plates 41. The condition occurs when the air temperature falls below the "dew-point" temperature.

For example, referring back to prior art FIG. 2, considering normal summer conditions when the air temperature of an open space bathed in sun-rays is $t_1=35°$ C. and the relative humidity is 70%, one finds the absolute humidity is equal to $H_1=27.7$ g/m$^3$ and the dew-point temperature is 28° C. Considering a normal summer evening humidity of 80% and natural cooling of air below $t_2=25°$ C., which corresponds to the absolute humidity of $H_2=18.4$ g/m$^3$, one can expect the desired natural process of water condensing into water aerosols. Consider, in addition, that there is an evening breeze, for example, from the sea. Consider also a normal weather sea breeze of velocity v=5 m/sec, which brings fresh portions of the humid air, and given exemplary dimensions of catcher 40: L=1 m, w=1 m, and h=1 m, an estimated flux of water aerosols, crossing the considered passive catcher space, is $$(H_1 - H_2)Lwh\frac{v}{L} = (27.7 - 18.4) \times 5 = 46.5 \text{ g/sec}$$

Taking into the consideration that normally the summer evening breeze continues for 3 hours, the estimated daily potential of water produced is 46.5×3×3600=502,200 g=502.2 kg. Catcher 40, however, is not constructed to provide sufficiently effective trapping of condensed water-aerosols. The partially dried air flux 44, leaving catcher 40, takes away water aerosols, which are not caught, and water-vapors, which remain in a gaseous state.

Figure 5:
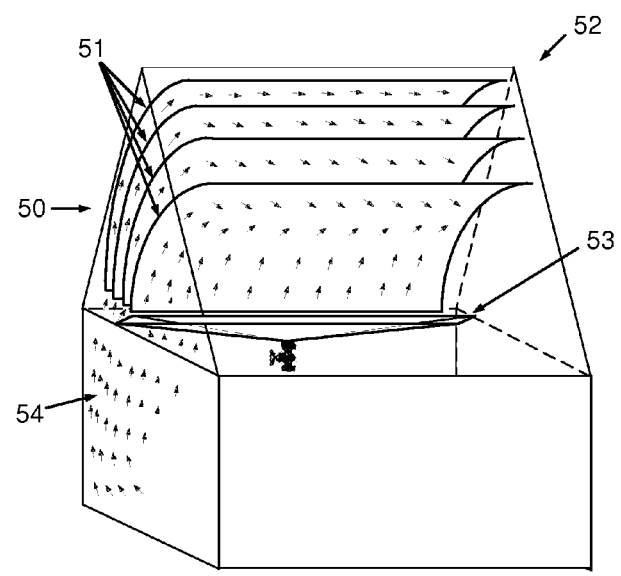
FIG. 5 is a schematic representation of a passive water aerosols catcher, which is built-in within a plant growing incubator, constructed according to an exemplary embodiment of the present invention.

FIG. 5 is a schematic representation of a plant-growing incubator 52, having a built-in modified passive water aerosols catcher 50, comprising profiled plates 51, constructed according to an exemplary embodiment of the present invention. Normally, a plant-growing incubator is a closed conservatory, where air warming and ground watering are supported permanently. Sometimes it results in unwanted saturation of the air by water-vapors. A portion of air, which is warmed and saturated by vapors, rises naturally. The rising air has two causes. First, according to the aforementioned Klapeiron-Mendeleev law, the warmer gaseous air is predisposed to expansion, thereby decreasing its own partial density and thereby becoming lighter and so rising. The second cause results from the fact that air saturated by water-vapors has more water molecules, which are lighter than average molecules of dry air, so the vapors rise. Thus, the air warmed and saturated by water naturally is up-directed, where it is cooled by profiled plates 51, which have a lower temperature. The cooled air loses water-vapors, which are transformed into water-aerosols, and drops of dew arise on the surfaces of profiled plates 51. The drops of dew trickle down to water collector 53. Cooled and dried air descends. The air circulation is shown schematically by the short arrows 54.

Figure 6:
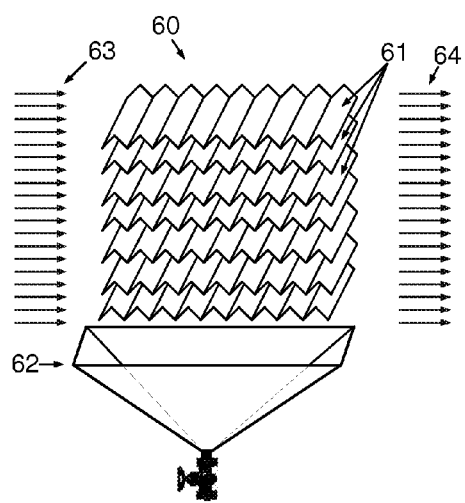
FIG. 6 is a schematic representation of an ecologically clean passive catcher of water aerosols, constructed according to an exemplary embodiment of the present invention.

FIG. 6 is a schematic representation of an ecologically clean passive catcher 60 of naturally condensed aerosols, constructed according to an exemplary embodiment of the present invention. Ecologically clean passive catcher 60 is exposed to an oncoming humid wind 63, bringing the water aerosols. Ecologically clean passive catcher 60 has profiled plates 61. The incoming humid wind 63 runs along profiled plates 61, losing water condensate, which turns into drops of dew trickling into water collector 62. The partially dried air flux 64 leaves ecologically clean passive catcher 60 and takes away water-vapors, which remain in the gaseous state.

Figure 7A:
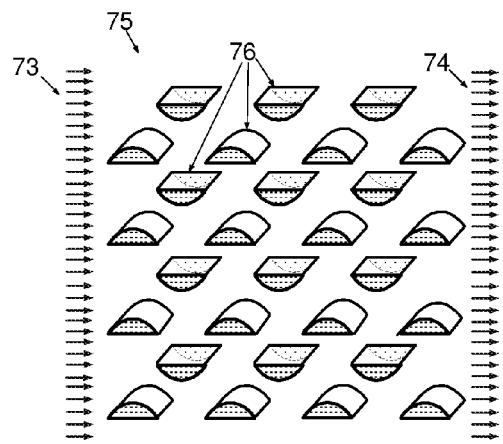
FIG. 7a is a schematic representation of an ecologically clean water condensation engine, having set of wing-like components, constructed according to an exemplary embodiment of the present invention.
Figure 7B:
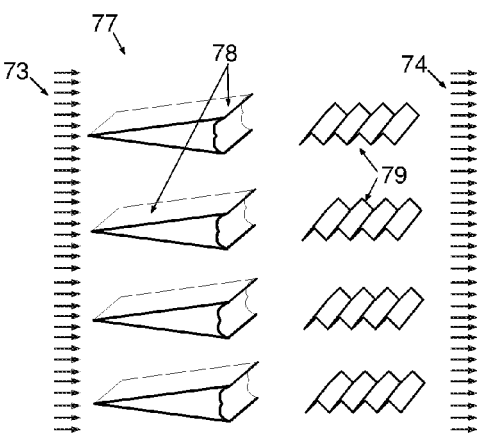
FIG. 7b is a schematic representation of an ecologically clean water condensation engine, having set of wedge-like components, constructed according to an exemplary embodiment of the present invention.
Figure 7C:
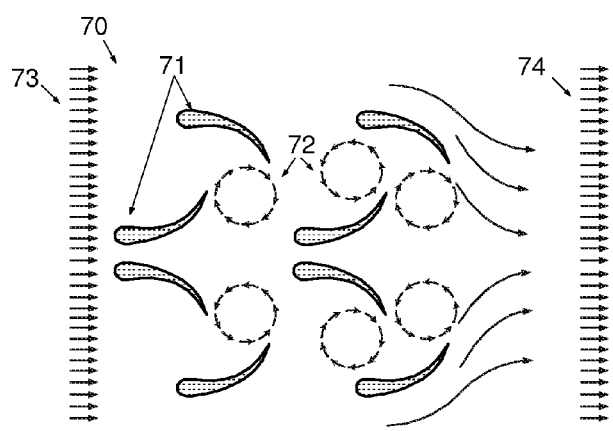
FIG. 7c is a schematic representation of an ecologically clean water condensation engine, having set of wing-like components, constructed according to an exemplary embodiment of the present invention.

FIG. 7a is a schematic representation of a water condensation engine 75, having stationary profiled wing-like details 76, constructed according to an exemplary embodiment of the present invention. The incoming humid wind 73 is considered as an inherent moving component of engine 75. The incoming humid wind 73 runs along the profiled wing-like details 76. Stationary profiled wing-like details 76 result in wing-like effects for acceleration of air portions and for making eddies and vortices that provoke the desired condensation of water-vapors into water-aerosols. The aerosols collect on the surfaces of profiled wing-like details 76, thereby forming drops of dew. Partially dried air flux 74 leaves the water condensation engine 75.

It follows, from the above description of water condensation triggering, that the arrangement, shapes and orientations of profiled wing-like details 76 may be optimized for higher efficiency of water condensation and collection. The described condensation triggering is relatively weak, because the natural breeze velocity is relatively slow.

FIG. 7*b* is a schematic representation of a water condensation engine 77, having stationary profiled wedge-like details 78, constructed according to an exemplary embodiment of the present invention. The incoming humid wind 73 runs along profiled wedge-like details 78. Profiled wedge-like details 78 result in effects for acceleration of air portions and for making eddies and vortices near the wider part of the wedge-like details. The vortices and eddies adsorb vapors from the air into water-aerosols. The aerosols collect on the surfaces of a set of profiled corrugated details 79, thereby forming drops of dew. The described creation of eddies and vortexes by natural breeze results in relatively weak water-condensation triggering, so the slightly dried leaving air flux 74 remains substantially humid.

FIG. 7*c* is a top view schematic drawing of a water condensation engine 70 exposed to incoming humid wind 73, constructed according to an exemplary embodiment of the present invention. Water condensation engine 70 comprises stationary profiled curved wing-like details 71, which act on the incoming air stream, resulting in eddying and the creation of high spin vortices 72. In addition, fresh portions of humid wind 73 make new portions of the circulating vortex in the same space. Assuming that input humid wind 73 is laminar, such a positive feedback loop re-enforces eddies resulting in said creation of high spin vortices 72. Vortices 72 have inherent pressure distribution, wherein inner pressure is lower and outer pressure is higher. An air portion, which is entrapped by one of high spin vortices 72, is accelerated and decompressed by the vortex. Adiabatically reduced pressure of the air portion is accompanied by decreased air portion temperature according to gas laws. The air cooling stimulates the desired condensation of the water-vapors into water-aerosols.

There is an additional trigger for water condensation. Quickly revolving air is inherently accompanied by friction between the moving air molecules, causes ionization of the moist air molecules. The ionized molecules become the centers for condensation of water polar molecules into aerosols. The aerosols collect on the surfaces of curved profiled wing-like details 71, thereby forming drops of dew. The drops of dew trickle into a water collector, which is similar to reference block 62 of FIG. 6, but not shown here. Also vortices 72 lose air portions. The advancing air portions constitute the dried air flux 74 leaving water condensation engine 70. Thus, in contrast to passive catcher 40 of FIG. 4 having naturally condensed dew, the details of water condensation engine 70 trigger the water condensation. The work for the triggering is performed at the expense of the incoming wind's power. An arrangement and shapes of curved profiled wing-like details 71 may be optimized for more efficient water condensation.

FIG. 8 is a schematic illustration of a trivial profiled horn-tube converging nozzle 80, which is positioned along the incoming wind on its way to a water condensation engine 81, constructed according to an exemplary embodiment of the present invention. Water condensation engine 81 is not detailed here. In particular, it may be similar to either water condensation engine 75 of FIG. 7*a* or water condensation engine 77 of FIG. 7*b* or water condensation engine 70 of FIG. 7*c* described above.

Profiled horn-tube 80 preferably has a profile contour 88 similar to a cosine-function curve and substantially different diameters 82 and 83 of open butt-ends: inlet 820 and outlet 830. A flux of humid wind 84 enters profiled horn-tube nozzle 80 at inlet 820 having bigger diameter 82 and comes out through narrow throat outlet 830 having a smaller diameter 83. Cosine-like contour 88 and sufficient length 89 between but-ends 820 and 830 provide the conditions for laminar flow of the flux.

Smaller diameter 83 is large enough to justify neglecting any air viscosity phenomenon, while considering Bernoulli's principle. According to the continuity equation, the point 85 of the flux crossing throat outlet 830 of smaller diameter 83 experiences higher velocity than the velocity at the flux point 86 near inlet 820 having bigger diameter 82. Thus, assuming incompressible gas, the flux velocity is inversely-proportional to the cross-sectional area. For example, if inlet 820 diameter 82 throat outlet 830 is 3 times bigger than throat outlet 830 diameter 83, the velocity of output flux at point 85 is $3^2=9$ times higher than the velocity of the incoming air flux at the point 86. Thus, trivial profiled horn-tube nozzle 80 provides the high speed output air stream 87 desired for input into water condensation engine 81.

Horn-tube nozzle 80 itself may play the role of a water condenser. According to Bernoulli's principle, static pressure P of a convectively accelerated portion of air is reduced.

According to the Klapeiron-Mendeleev law concerning a hypothetical ideal gas state, and particularly for the case of slow-flowing wind approximated as an incompressible gas, i.e. for an isochoric process, according to Gay-Lussac's law, $$\frac{P}{T} = Const,$$

where P is the static pressure and T is the absolute temperature of the gas portion. This means that in an approximation of ideal gas laws, reduced static pressure P is accompanied by a proportional decrease of the associated air portion's absolute temperature T. The decreased temperature T may trigger the desired water condensation. The exothermal water condensation is a not-equilibrium process, and the condensed water and surroundings are warmed. So while the considered air portion remains humid, the temperature of the convectively accelerated air portion is to be not lower than the dew-point temperature, wherein the dew-point temperature itself becomes lower as the air humidity is reduced.

Figure 8:
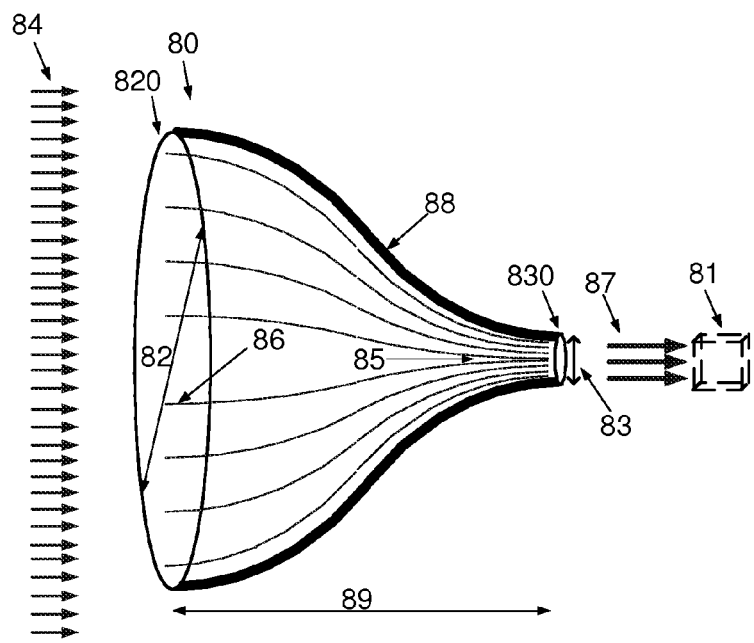
FIG. 8 is a schematic representation of a trivial profiled horn-tube [converging nozzle] and a water condensation engine, constructed according to an exemplary embodiment of the present invention.

In view of the description referring to FIG. 8, it will be evident to a person skilled in the art, that cooled output air stream 87 may be utilized for blowing around and cooling other objects that are located outside of the profiled horn-tube nozzle 80. However, it is not always practical to apply horn-tube nozzle 80, having a large area inlet 820, for incoming wind convective acceleration. It is neither easy nor economical to build a wide horn-tube nozzle 80, for example, having inlet 820 diameter 82 of 30 m and throat outlet 830 diameter 83 of 1 m, that would be sufficiently durable for the case of a strong gust of wind.

Figure 8A:
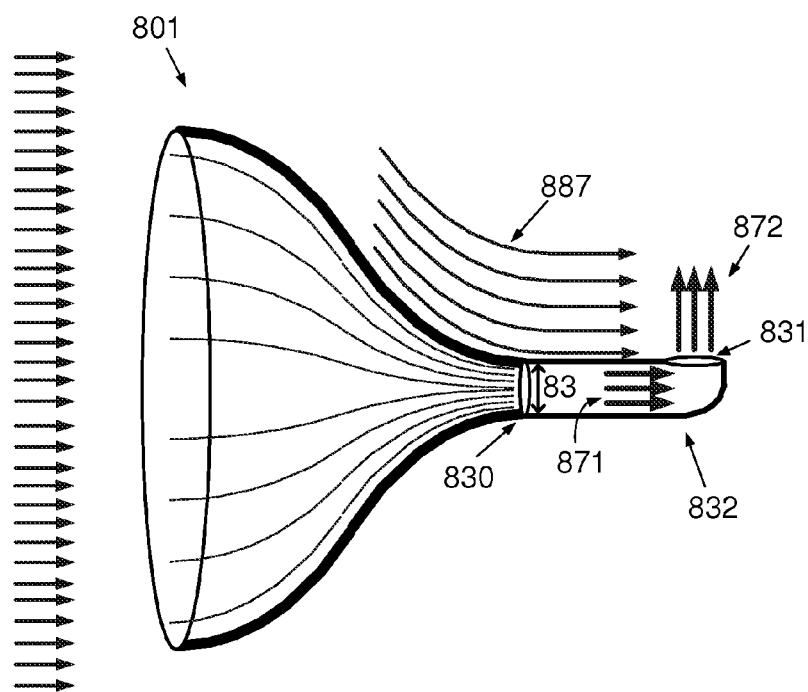
FIG. 8a is a schematic representation of a modified profiled horn-tube, supplied by a redirecting duct, constructed according to an exemplary embodiment of the present invention.

FIG. 8a is a schematic drawing, showing a modified profiled horn-tube 801, similar to the mentioned converging nozzle 80, described referring to FIG. 8, constructed according to an exemplary embodiment of the present invention. Modified profiled horn-tube 801 is now supplied by a duct 832, which redirects the inner air stream 871 following through narrow throat 830 to an outlet 831 having a diameter equal to diameter 83 of narrow throat 830, and oriented perpendicular to the outer wind stream 887 direction. Thus, convectively accelerated air stream 871 is redirected to a perpendicular direction and exits as the air stream 872 crossing outer wind stream 887. Outer wind stream 887 sucks exiting air stream 872 according to the Coanda-effect, and this serves to further increase the speed of air stream 871 inside the horn-tube 801. Thereby the redirected out-coming air stream 872 is faster than the output air stream 87, described referring to FIG. 8.

Figure 8B:
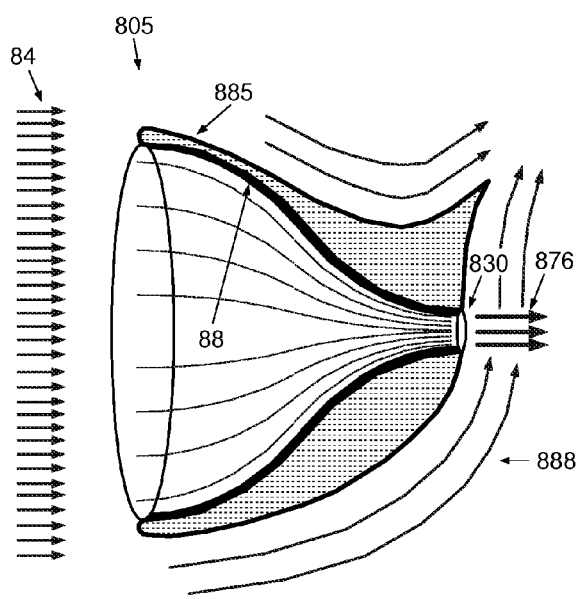
FIG. 8b is a schematic representation of a modified profiled horn-tube, supplied by a cover, redirecting outer wind, according to an exemplary embodiment of the present invention.

FIG. 8b is a schematic illustration of another modified horn-tube 805, constructed according to an exemplary embodiment of the present invention. Modified horn-tube 805 is similar to converging nozzle 80, again having the inner walls cosine-like shape 88, described referring to FIG. 8, but now supplied by an outer non-symmetrical wing-like cover 885, redirecting the outer air stream 888 flowing around wing-like cover 885 past narrow throat outlet 830. Redirected outer air stream 888 sucks the exiting air stream 876 according to the Coanda-effect. Thus, air stream 876 is accelerated by the two mechanisms: convectively by inner walls converging cosine-like shape 88; and by the Coanda-effect sucking, so that exiting air stream 876 is faster than exiting air stream at point 87, described above with reference to FIG. 8.

Figure 8C:
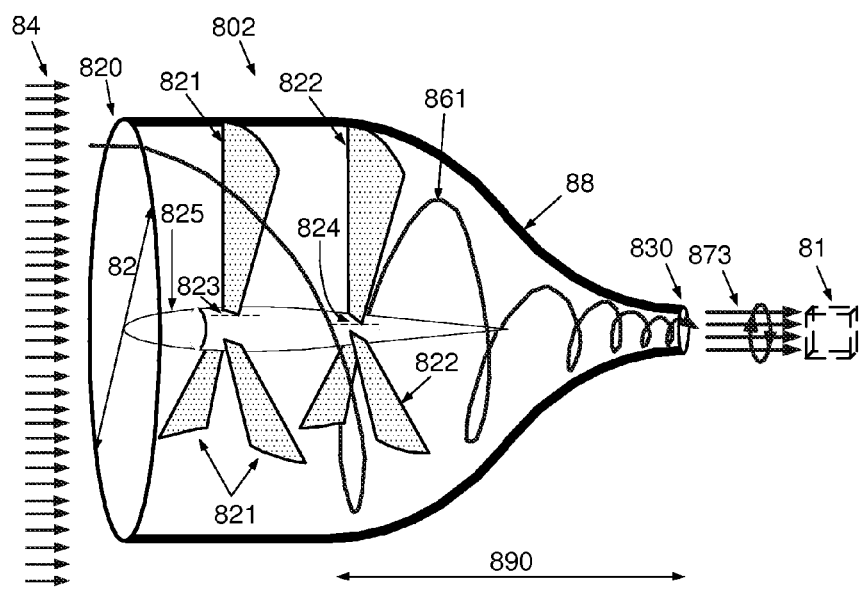
FIG. 8c is a schematic representation of a modified profiled horn-tube, revolving and converging wind, according to an exemplary embodiment of the present invention.

FIG. 8c is a schematic representation of a yet further modified profiled horn-tube 802, causing a converging as well as revolving wind, according to another exemplary embodiment of the present invention. In contrast to converging nozzle 80, described above with reference to FIG. 8, yet further modified profiled horn-tube 802 is provided with stationary blades 821 fixed on a streamlined blade-grip 825, such that stationary blades 821 decline the inner wind stream on an angle 823 from the original direction of incoming wind 84. The declined wind stream is imparted with a rotational moment by the coiled walls of horn-tube 802, and so propagates helically. The helical motion is shown schematically by a helical curve 861.

This revolving technique may be cascaded by stationary blades 822, following after stationary blades 821, and having a declining angle 824 bigger than preceding angle 823. Thus, by cascading such stationary blades, it becomes possible to create an air stream having a spiral motion of relatively short steps between the trajectory coils. The spiral trajectory, which accomplishes laminar spiral convectively flowing motion of air portions, allows for a reduced length 890 of converging segment 88 of modified profiled horn-tube 802 compared to length 89 described above with reference to FIG. 8. Again, inlet 820 has diameter 82. If converging segment 88 of modified profiled horn-tube 802 is the same as converging nozzle 80 described above with reference to FIG. 8, then, assuming an incompressible gas, the spiral motion of air in the converging segment of modified profiled horn-tube 802 has the same velocity of forward air movement as the velocity of air flowing forward through the converging nozzle 80 described above with reference to FIG. 8, according to the continuity equation.

The added spin motion provides for two accelerations: a centripetal acceleration for changing the velocity direction and a convective acceleration for increasing an absolute value of the velocity with maintaining the same convective forward motion. The resulting air stream 873, exiting from modified profiled horn-tube 802 throat 830 and entering water condensation engine 81, has both components of convectively accelerated motion: forward and spinning. This combined convective acceleration is at the expense of potential energy of the convectively moving air portion, and so it is accompanied by air portion static pressure reduction, according to Bernoulli's principle and decreasing temperature according to Gay-Lussac's law. Moreover, the spinning motion is accompanied inherently by adiabatic radial redistribution of static pressure, wherein local static pressure near the rotation axis is lower. Thus, air portions which are near the rotation axis are also cooled adiabatically. The decreased temperature triggers water condensation.

In view of the description referring to FIG. 8c, it will be evident to a person skilled in the art, that many kinds of constructive solutions might be applied alternatively to guide blades 821 and 822 and streamlined blade-grip 825 to achieve the desired spinning feature.

In view of the description referring to FIG. 8c, it will be evident to a person skilled in the art, that cooled blade-grip 825, further supplied by a heat conductor (not shown here), may be applied for cooling other objects that are located outside of the profiled horn-tube 802.

Figure 8D:
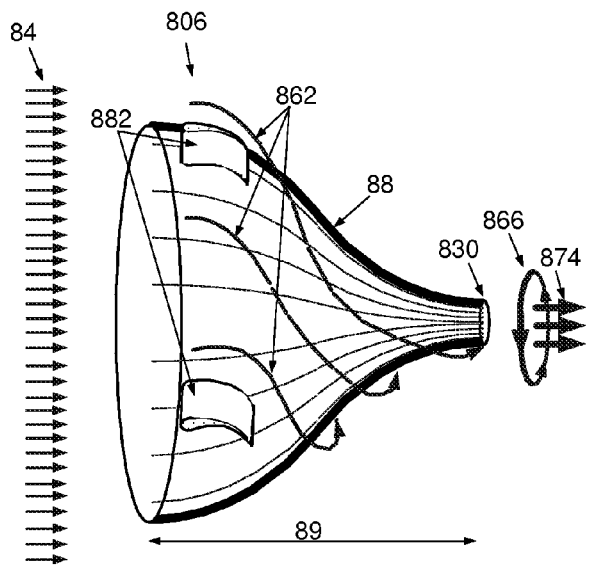
FIG. 8d is a schematic representation of a modified profiled horn-tube revolving portions of wind flowing outside and converging portions of wind flowing within the horn-tube, constructed according to an exemplary embodiment of the present invention.

FIG. 8d is a schematic representation of a modified profiled horn-tube 806, having revolving portions of wind flowing outside and converging portions of wind flowing within, according to an exemplary embodiment of the present invention. In contrast to the trivial profiled horn-tube converging nozzle 80 described above with reference to FIG. 8, modified profiled horn-tube 806 is provided with stationary wing-like blades 882, which are arranged externally. Wing-like blades 882 redirect the outer portions of wind, whose forward motion is converged in alignment with cosine-like profile contour 88. Again, horn-tube 806 has length 89.

The resulting trajectories of the wind portions emanating from oncoming wind 84, and flowing outside horn-tube 806, are helical curves 862, having forward, revolving and converging components of motion. The revolving component of the outer wind portions behind throat outlet 830 is shown schematically by the circulating arrows 866. Revolving air 866 has lower static pressure in the center of the rotation. This reduced static pressure behind throat outlet 830 sucks-out convectively accelerated inner portions of air, thereby accelerating the exiting stream 874. As a result, exiting stream 874 is faster than exiting stream 87, which is described above with reference to FIG. 8.

Figure 8E:
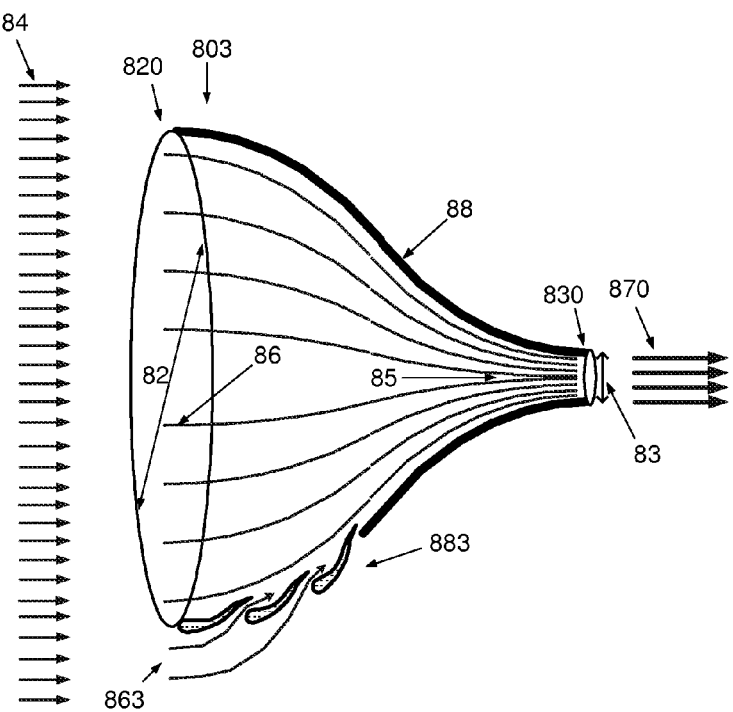
FIG. 8e is a schematic representation of a modified profiled horn-tube, having profiled contour comprising scaly fragments with wing-like details, constructed according to an exemplary embodiment of the present invention.

FIG. 8e is a schematic illustration of a newly modified profiled horn-tube 803, according to an exemplary embodiment of the present invention. Newly modified profiled horn-tube 803 does not have a completely solid cosine-like contour 88, but instead incorporates scaly fragments comprising wing-like details 883, which provide for additional portions 863 of flowing air to enter between wing-like details 883 into the inner space of newly modified horn-tube 803.

The phenomenon can be considered to effectively provide a squaring increase of oncoming flux front 84, such that the effective area of oncoming flux front 84, being subject to convective acceleration, is wider than the area of the cross-section enclosed by wide inlet 820 having bigger diameter 82. The portion of oncoming flux 84, increased by additional portion 863, being under inner convective acceleration, further increases the speed of the output air stream 870, past diameter 83 of narrow throat 830, according to the continuity equation. Thus, output air stream 870 is faster than output air stream 87, described above with reference to FIG. 8.

Figure 8F:
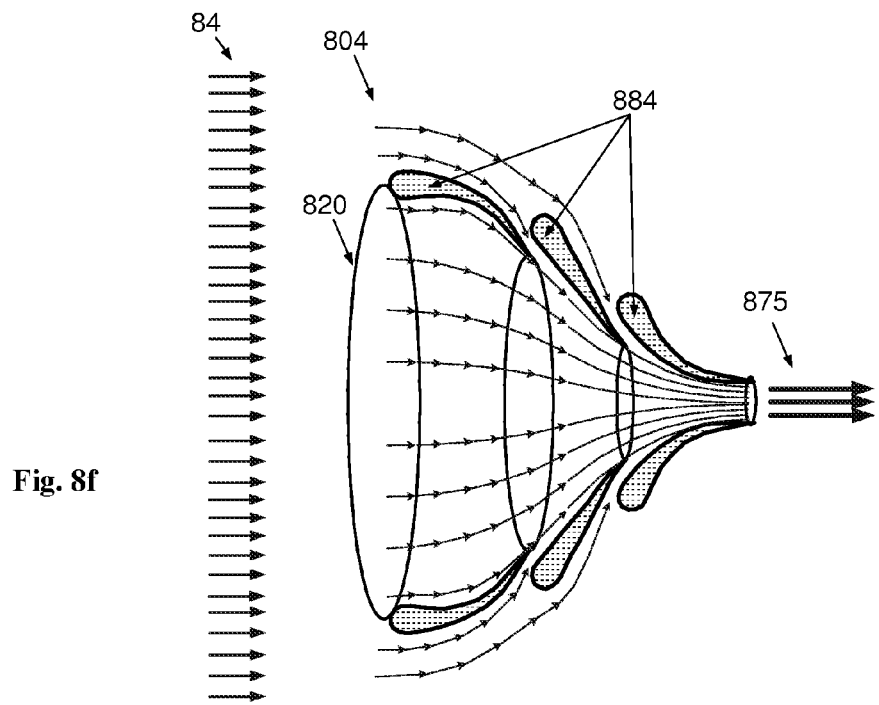
FIG. 8f is a schematic drawing showing a horn-like tapering tube, construed from coiled-up wings, according to an exemplary embodiment of the present invention.

FIG. 8f is a schematic illustration of a cascade 804 of coiled-up wings 884, according to an exemplary embodiment of the present invention. Such construction results in a rapidly exiting narrow air stream 875, by converging a wide front of oncoming wind 84, wherein the effective area of the oncoming front is wider than the area of the circular cross-section, which is enclosed by wide inlet 820 of cascade 804 of coiled-up wings 884.

Figure 8G:
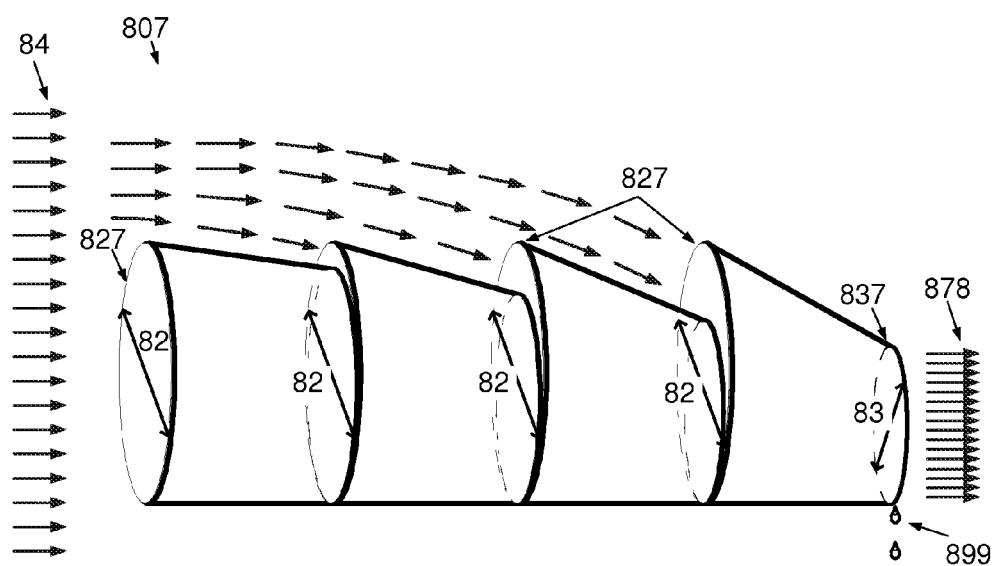
FIG. 8g is a schematic drawing, showing a cascade of sequentially arranged truncated cones, constructed according to an exemplary embodiment of the present invention.

FIG. 8g is a schematic illustration of a cascade of sequentially arranged truncated cones 807 operating as a water condensation engine, constructed according to an exemplary embodiment of the present invention. All of sequentially arranged truncated cones 807 have inlets 827 having cross-sections of equal diameters 82, and each succeeding truncated cone 807 has an outlet cross-section narrower than the outlet cross-section of previous truncated cone 807, such that the last truncated cone's outlet 837 is of the smallest diameter 83. Such construction results in a rapidly exiting narrow air stream 878 by converging a wide front of oncoming wind 84, wherein an effective area of the oncoming front is wider than the area of the cross-section enclosed by the first of inlets 827 of sequentially cascaded truncated cones 807. Convectively accelerated and thereby cooled outgoing air stream 878 emits droplets of condensed water 899.

Figure 9:
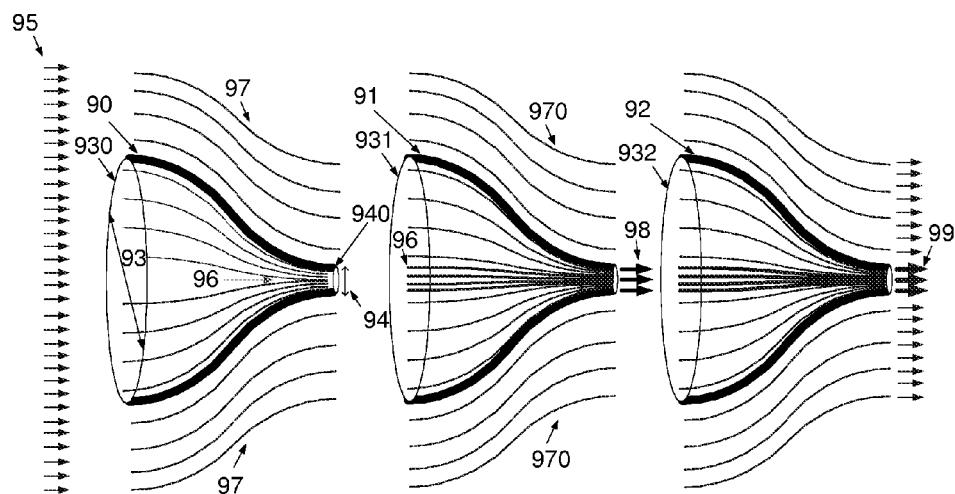
FIG. 9 is a schematic representation of a construction comprising cascaded horn-tubes as a water condensation engine, constructed according to an exemplary embodiment of the present invention.

FIG. 9 is a schematic illustration of cascaded profiled horn-tubes: 90 having the inlet 930, 91 having the inlet 931 and 92 having the inlet 932. This cascade, exposed to oncoming humid wind 95, operates as a water condensation engine, according to an exemplary embodiment of the present invention. The profiled horn-tube 90 has substantially different diameters 93 and 94 of open butt-ends at inlet 930 and throat outlet 940, respectively. A flux of humid wind 95 enters profiled horn-tube 90 from inlet 930, having bigger diameter 93, and comes out through throat outlet 940, having smaller diameter 94.

For example, if narrow throat outlet 940 diameter 94 is smaller than the inlet 930 diameter 93 by 3 times, then according to the continuity equation, the output flux 96 velocity near throat outlet 940 is $3^2=9$ times higher than the velocity of air flux 95 near inlet 930. Moreover, part of humid wind flux 95 flows around profiled horn-tube 90 forming outer flowing stream 97.

Furthermore, both fluxes, inner flux 96, exiting from narrow throat outlet 940, and outer flux 97, entering cascaded profiled horn-tube 91. Profiled horn-tube 91 transforms both inner flux 96 and outer flux 97 into the resulting flux 98, exiting the narrow throat outlet of profiled horn-tube 91. The velocity of resulting flux 98 is almost double the velocity of flux 96. Next cascaded profiled horn-tube 92 provides yet added fresh outside portions 970 of wind 95 to the resulting re-enforced flux 99, having a cross-sectional area equal to the area of the narrow throat outlet of profiled horn-tube 92, and having a velocity that is almost triple that of the velocity of flux 96.

Thus, cascading many profiled horn-tubes, it is possible to concentrate a huge front of humid wind into the narrow resulting flux of extra-high velocity. If the extra-high velocity air stream thereby created reaches the speed of sound, a shock wave is launched. The shock wave launching is at the expense of the internal energy of the air, resulting in "shock" decrease of the air temperature, thereby triggering the process of abundant vapor condensation into water-aerosols.

In view of the foregoing description referring to FIG. 9, it will be evident to a person skilled in the art that various modifications of horn-tubes may be cascaded. For example, a cascade of modified horn-tubes 806 (FIG. 8d) constitutes an aggregated converging system (not shown here) improved by revolving both inner and outer air streams.

Figure 9A:
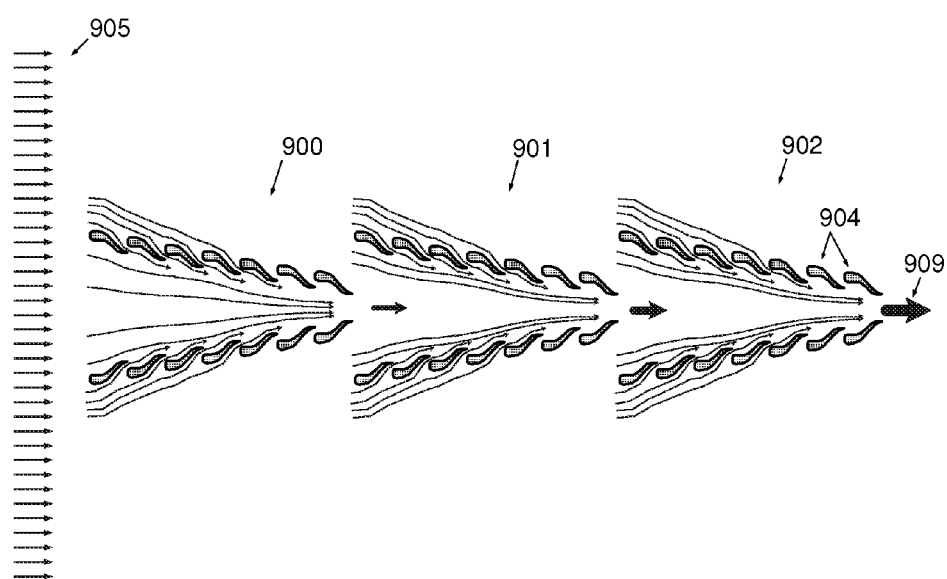
FIG. 9a is a schematic drawing of a cascade of scaly horn-tubes, according to an exemplary embodiment of the present invention.

FIG. 9a is a schematic illustration of a cascade of scaly horn-tubes 900, 901, and 902, constructed according to an exemplary embodiment of the present invention. In contrast to aforementioned in FIG. 9 profiled horn-tubes 90, 91, and 92 having solid contours, horn-tubes 900, 901, and 902 have scaly contours, comprising cascaded wing-like details 904. Such a construction provides a wide converging front of oncoming wind 905 into a narrow fast outgoing stream 909.

Figure 9B:
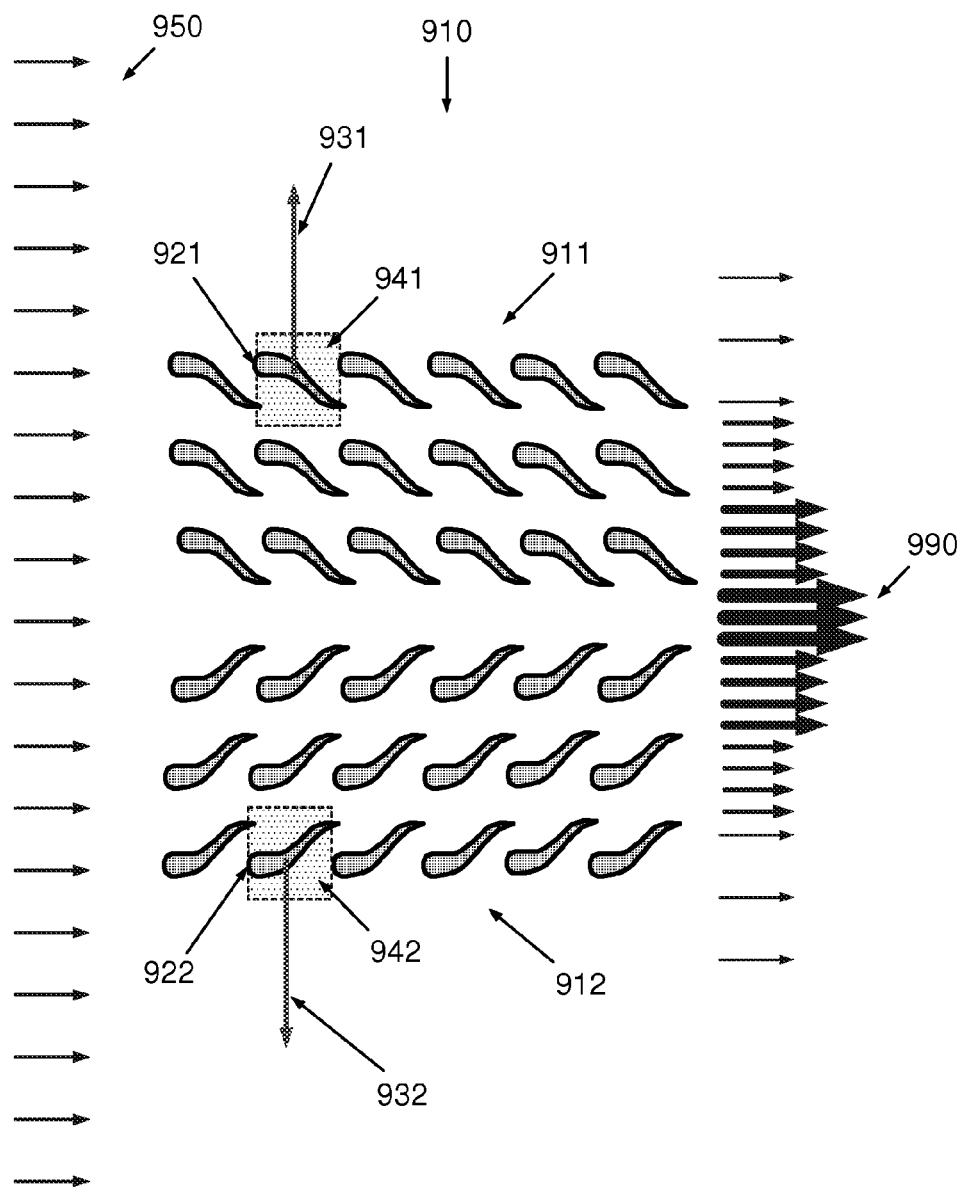
FIG. 9b is a schematic drawing of a cascade of wing-like details, converging wide front of oncoming wind, according to an exemplary embodiment of the present invention.

FIG. 9b is a schematic illustration of an arrangement 910 of cascaded wing-like details 911 and cascaded mirror-reversed wing-like details 912, constructed according to an exemplary embodiment of the present invention. In particular, an individual wing-like detail 921 is a constituent of cascaded wing-like details 911 and an individual mirror-reversed wing-like detail 922 is a constituent of cascaded mirror-reversed wing-like details 912. So-called lifting forces, shown here as the vectors 931 and 932, act from the flowing portions 941 and 942 of the oncoming wind 950 on streamlined opposite wing-like details 921 and 922 correspondingly. According to the Third Law of Newton, the opposite wing-like details 921 and 922 act to corresponding portions 941 and 942 of the flowing wind in opposite directions.

Thus, the opposite exemplary wing-like details 921 and 922, and, in general, 911 and 912, act on oncoming wind 950 converging air stream front into a narrow and fast outgoing air stream 990. Such an aggregation of opposite wing-like details 911 and 912 operates as a water condensation engine by accelerating humid air streams, according to an exemplary embodiment of the present invention. It will be evident to a person skilled in the art, that opposite wing-like details 911 and 912 may be implemented by the coiling-up of wings.

Figure 9C:
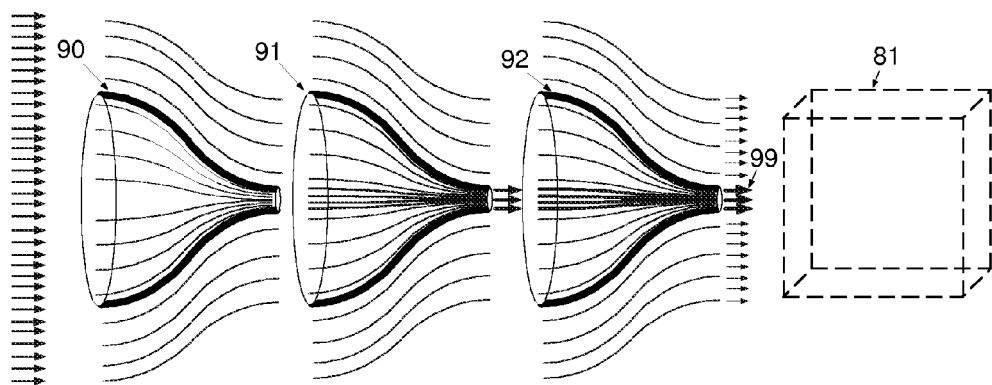
FIG. 9c is a schematic representation of a construction comprising cascaded horn-tubes and a water condensation engine, constructed according to an exemplary embodiment of the present invention.

FIG. 9c is a schematic illustration of the aforementioned water condensation engine 81, arranged behind cascaded profiled horn-tubes 90, 91 and 92, described hereinbefore, referring to FIG. 9, according to an exemplary embodiment of the present invention. In this case the high-speed air flux 99 provides a highly efficiency water condensation engine 81. It is important that the size of each cascaded profiled-tube may be commensurate with the size of water condensation engine 81 in order for the construction to remain reasonably feasible.

In view of the foregoing description referring to FIG. 9c, it will be evident to a person skilled in the art that various modifications of engines, operating on natural wind power and destined for various purposes, may be applied instead of water condensation engine 81. For example, a so-called wind turbine destined for electricity generation may be arranged behind the cascaded horn-tubes, according to an exemplary embodiment of the present invention.

Figure 9D:
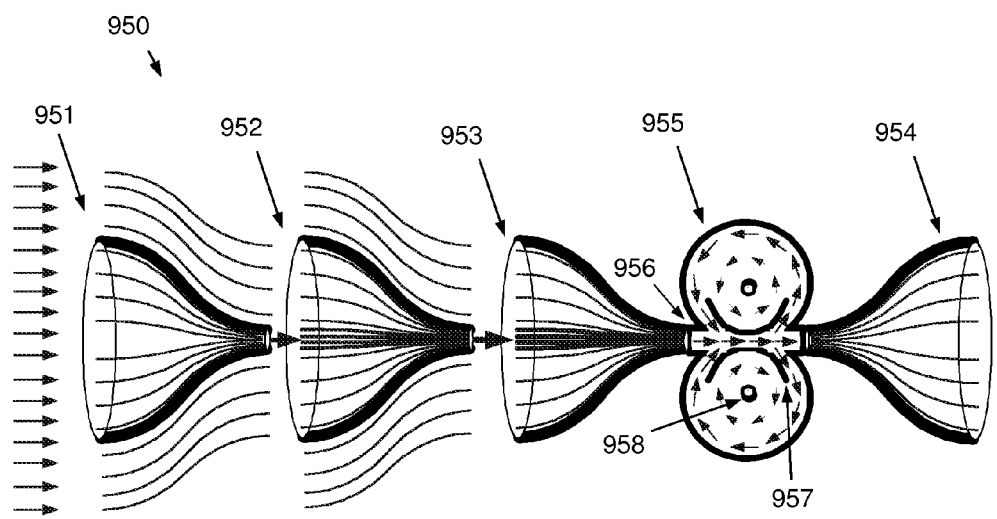
FIG. 9d is a schematic top-view of a water condensation engine comprising in-line cascaded converging bells, narrow throat, supplied by two cylindrical chambers, and a diverging bell, constructed according to an exemplary embodiment of the present invention.
Figure 10:
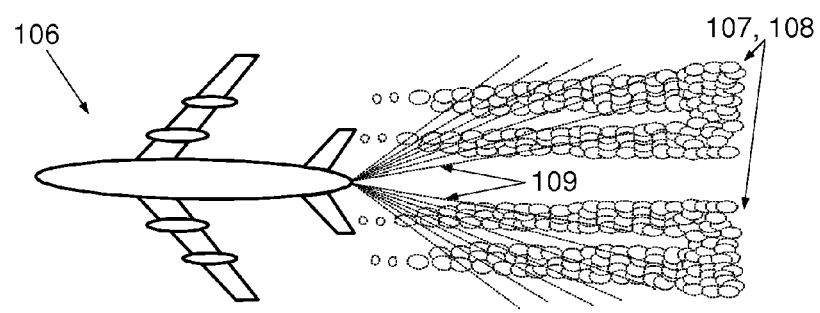
FIG. 10 is a schematic illustration of abundantly condensed water-aerosols and sublimated micro-flakes-of-snow behind wings of flying high-speed aircraft, ejecting a water adsorbing dust, according to an exemplary embodiment of the present invention.
Figure 11:
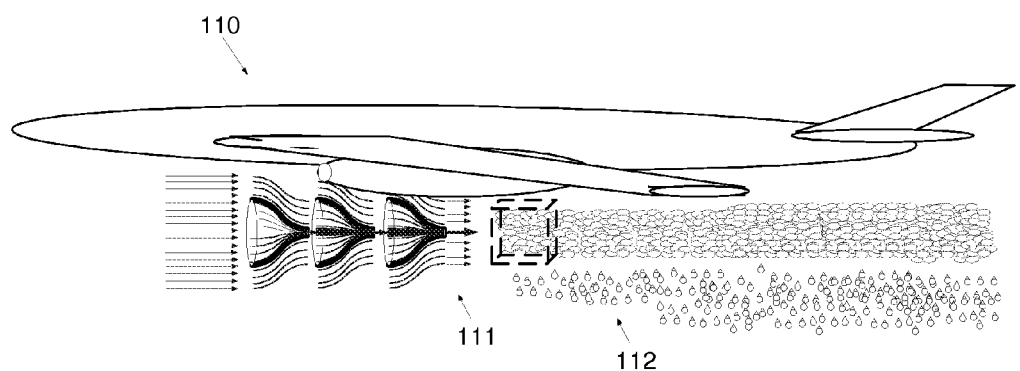
FIG. 11 is a schematic illustration of rain creation by an aggregation of an airplane and attached sequence of horn-tubes and water condensation engine, constructed according to an exemplary embodiment of the present invention.
Figure 12:
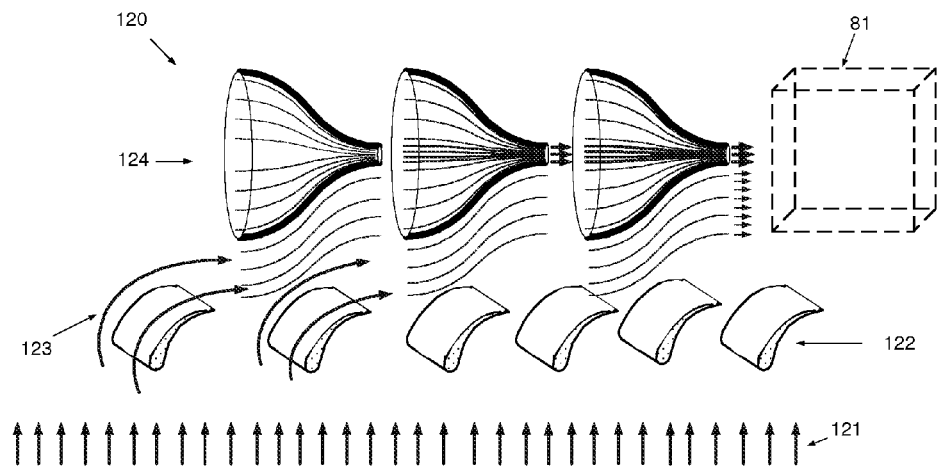
FIG. 12 is a schematic illustration of a top-view of a constructive solution for redirecting oncoming wind to power by the wind a water condensation engine oriented perpendicularly to the origin wind direction, constructed according to an exemplary embodiment of the present invention.
Figure 13:
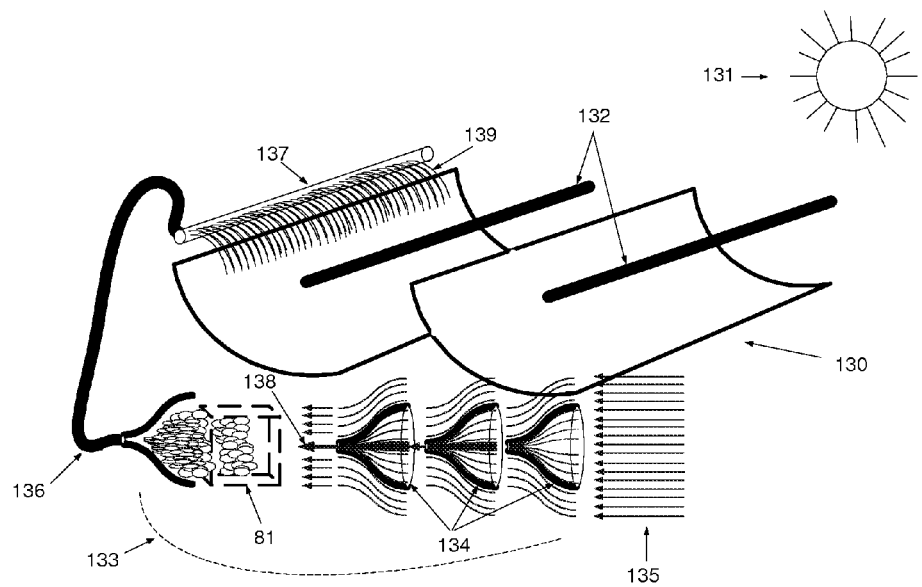
FIG. 13 shows schematically an exemplary system of solar thermal energy collection, where focusing plates are supplied with a cleaning construction, constructed according to an exemplary embodiment of the present invention.

FIG. 9d is a schematic top-view of a water condensation engine 950, comprising in-line, cascaded, converging bells 951, 952, and 953, a narrow throat 956 supplied by two closed cylindrical chambers 955, and a diverging bell 954. The in-line cascaded converging bells 951, 952, and 953 concentrate and accelerate the oncoming wind, reaching the narrow throat 956. The fast air stream flows around rounded blades 957 sucking air from and blowing air portions into chambers 955 in a positive feedback loop, that results in fast rotating and permanently refreshing vortices, shown schematically by short arrows within chambers 955. The vortices created have inherent pressure distribution, wherein inner pressure is lower and outer pressure is higher. Adiabatically reduced pressure of the air portion is accompanied by decreasing temperature. Air cooling near the centers of vortices stimulates the desired condensation of water vapors into aerosols. There are water catchers 958 at the centers of the vortices rotation. Also, dew arises on the surfaces of blades 957.

FIG. 10 is a schematic illustration of highly condensed water-aerosols 107 and sublimated micro-flakes-of-snow 108, which are observed behind the wings of high-speed aircraft 106. Aircraft 106 ejects a water adsorbing dust 109. Water adsorbing dust 109 causes water-aerosols 107 and sublimated micro-flakes-of-snow 108 to aggregate in rain-drops and/or bigger flakes of snow, which fall down. This exemplary extravagant technique for harvesting water from air may become useful for extinguishing a forest fire.

In contrast to the aforementioned method to supply much water using a very heavy airplane, relatively light high-speed aircraft 106 needs substantially less fuel because the work performed by aircraft 106 is mainly for eddying air and producing vortices, but not for lifting heavy water reservoirs. Moreover, in this case high-speed aircraft 106 is designed for fast operation, which may be of the highest priority for the exemplary case. Nonetheless, it is not comfortable to use high-speed aircraft 106 for extinguishing a forest fire.

In contrast to the use of high-speed aircraft 106, FIG. 11 is a schematic illustration of a slower airplane 110, having an attached construction 111, which is similar to the apparatus described with reference to FIG. 9*c*, and constructed according to an exemplary embodiment of the present invention. Such an aggregation may be applied for effective extracting rain 112 from air in order to extinguish forest fires.

Referring again to FIG. 9*c*, at times topology may restrict the preferable orientation of a long in-line cascade of as many as 200 horn-tubes. For example, if only the sea shoreline is free for the in-line cascading of the horn-tubes and the direction of the sea-wind is substantially perpendicular to the shoreline, the construction shown in FIG. 9*c*, being exposed to the oncoming wind perpendicularly, will not operate efficiently.

FIG. 12 is a schematic top-view of a constructive solution 120 for the in-line cascaded profiled horn-tubes 124 and water condensation engine 81, which are similar to the construction described above with reference to FIG. 9*c*, but in FIG. 12 the orientation is perpendicular to the direction of side-wind 121, according to an exemplary embodiment of the present invention. The stationary profiled wing-like blades 122 are added to redirect side-wind 121 according to the Coanda-effect. The air flux 123 is redirected to substantially coincide with the direction of in-line cascaded horn-tubes 124. Constructive solution 120 operates efficiently for wind directions either along or perpendicular to in-line cascaded profiled horn-tubes 124.

FIG. 13 is a schematic illustration of an exemplary system for solar thermal energy collection, where focusing plates 130 are supplied with a cleaning sub-system 133, constructed according to an exemplary embodiment of the present invention. Focusing plates 130 are constructed as long parabolic mirrors, which are exposed to the sun 131. The sunlight is reflected by the focusing plates 130 and concentrated on Dewar tubes 132, arranged along the focal axes of the parabolic mirrors comprising focusing plates 130. A heat transfer fluid, preferably oil, runs through Dewar tubes 132 to absorb the concentrated sunlight. Normally, focusing plates 130 occupy a very large area.

Cleaning sub-system 133, in principle, is similar to the construction described with reference to FIG. 9*c*. Cleaning sub-system 133 comprises a very long cascade of horn-tubes 134. For example, there may be 200 horn-tubes 134 (here only 3 horn-tubes 134 are shown), arranged near focusing plates 130. A very long cascade of horn-tubes 134 sucks a wide front of oncoming wind 135 as described above with reference to FIGS. 9 and 9*c*.

Cleaning sub-system 133 comprises a water condensation engine 81, which is now supplied with a hose 136 having a douche 137 on the output butt-end. A very long cascade of horn-tubes 134 results in a converged narrow flux 138 of air at extra-high velocity, providing that water condensation engine 81 operates efficiently. The distilled water, condensed from the air, is transmitted to the focusing plates 130 through hose 136 due to the air flux, which emanates from water condensation engine 81. The running distilled water 139 cleans the surfaces of focusing plates 130 from natural dust.

FIG. 14*a* is a schematic illustration of helicopter 143 supplied with attached convergent-divergent nozzle 144 having a form of a big horn-tube with a wide upper inlet, narrow throat, and widened lower outlet, constructed according to an exemplary embodiment of the present invention. Such an aggregation concentrates air stream 145 originally sucked by helicopter 143's propeller 155. The convergent-divergent nozzle 144 causes also sucking of air portions, which flow outside of nozzle 144 according to the Coanda-effect, thereby increasing mass of air 158, which is blown under helicopter 143. The concentrated downward air stream 146 out-flowing from the convergent-divergent nozzle 144's outlet has higher speed, reduced static pressure, and decreased temperature, relatively to originally sucked air stream 145. This is according to well-known investigations of compressible-expandable gas convective motion, described hereinbefore in view of rocket nozzle 100 with reference to prior art FIG. 1*b*. The cooled air stream 146 may trigger off condensation of water-vapor into rain-drops 147. Such an aggregation may be applied for effective extracting rain-drops 147 from air, for example, in order to extinguish forest fires.

Figure 14A:
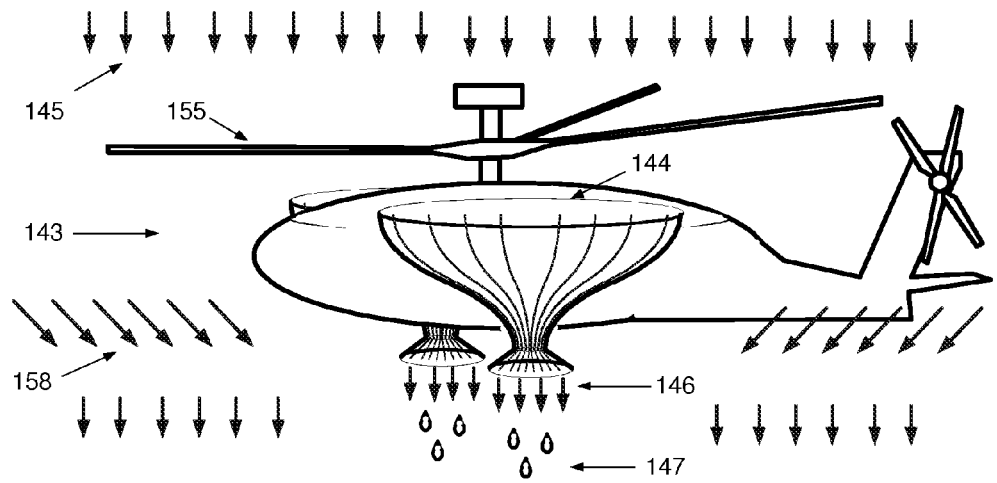
FIG. 14a is a schematic illustration of a helicopter supplied with attached converging nozzles, constructed according to an exemplary embodiment of the present invention.
Figure 14B:
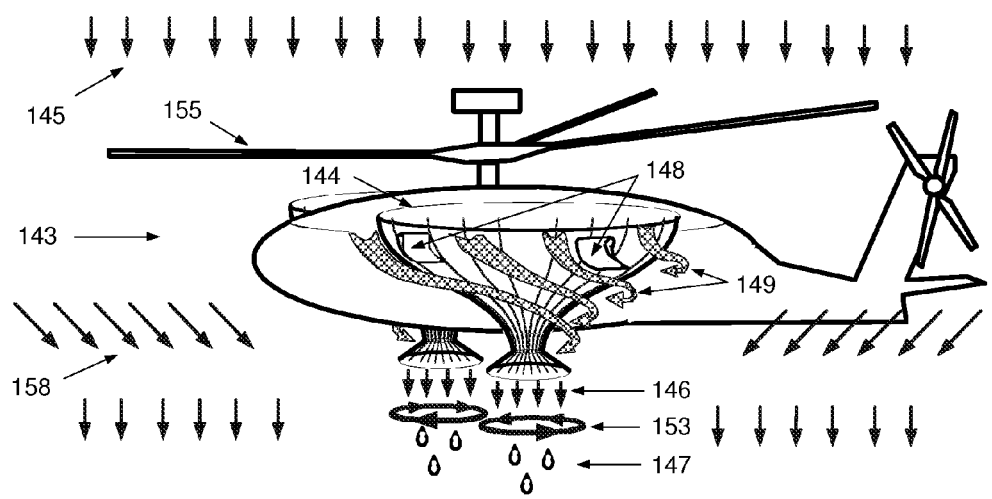
FIG. 14b is a schematic illustration of a helicopter supplied with attached converging nozzles and wing-like blades, constructed according to an exemplary embodiment of the present invention.

FIG. 14b is a schematic illustration of helicopter 143 having attached convergent-divergent nozzle 144 further supplied with stationary wing-like blades 148 redirecting air stream 145's portions 149, which are sucked by helicopter 143's propeller 155 and flowing outside of convergent-divergent nozzle 144. The redirected air portions 149 get a rotation motion, according to the Coanda-effect. The rotation motion is shown here schematically by circulating arrows 153. The convectively accelerated downward air stream 146 is sucked-out by the rotating air portions 149 and, therefore, gets addition acceleration. A mini-tornado, formed thereby, triggers off condensation of water-vapor into rain-drops 147. it will be evident to a person skilled in the art, that air stream portions, which flow inside of convergent-divergent nozzle 144, can be also forced to be rotated by arranging inner blades (not shown here) that may improve the mini-tornado useful properties.

Figure 15A:
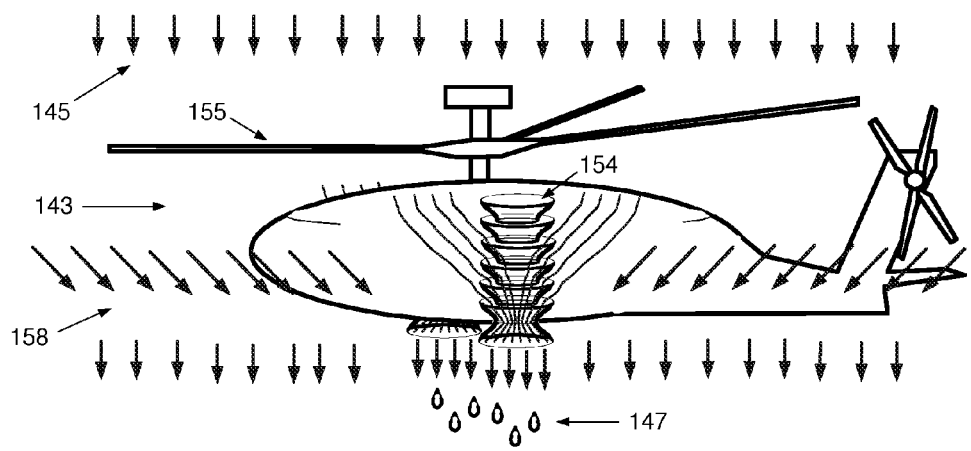
FIG. 15a is a schematic illustration of a helicopter supplied with an attached cascade of converging nozzles, constructed according to an exemplary embodiment of the present invention.

FIG. 15a is a schematic illustration of helicopter 143 supplied with an attached cascade of relatively small converging and diverging nozzles 154, constructed according to an exemplary embodiment of the present invention. In contrast to bulky and unwieldy convergent-divergent nozzle 144 described with reference to FIG. 14a, the substantially compact cascade of converging and diverging nozzles 154 may provide a stronger air stream concentration-effect and, thereby, more efficient condensation of water-vapors into rain-drops 147.

Negative and positive lift-effects can be defined for an aggregation, comprising helicopter 143 supplied by an attached air stream converging system such as 144 (FIG. 14a) or 154 (FIG. 15a). So, the negative lift-effect is defined by added mass, drag, and skin-friction area, and the positive lift-effect is defined by an air stream convective acceleration and by an increased mass of air 158, which is blown under helicopter 143.

The negative lift-effect of the attached cascade of small converging and diverging nozzles 154 is weaker than the negative lift-effect of the attached convergent-divergent nozzle 144 (FIG. 14a) because of relatively reduced mass, drag, and skin-friction resistance. At the same time, the positive lift-effect of the attached cascade of small converging and diverging nozzles 154 may be stronger than the positive lift-effect of the attached convergent-divergent nozzle 144 (FIG. 14a) as a wider front of the downward air stream may be converged by nozzles 154. The positive lift-effect of converging system either 144 (FIG. 14a) or 154 (FIG. 15a), which is defined by an air stream convective acceleration, may be explained from a mechanics point of view as well as from the Energy Conservation Law point of view. From the mechanics point of view, in this case the downward air stream is convectively accelerated according to the equation of continuity, and therefore enforces the lift-effect according to the Newton's Third Law. And from the Energy Conservation Law point of view, a certain amount of a cooled air portion's internal potential energy is transformed into the additional kinetic energy of the downward air stream according to Bernoulli's principle and the gas state laws. The additional kinetic energy of the downward air stream defines the positive lift-effect.

Figure 15B:
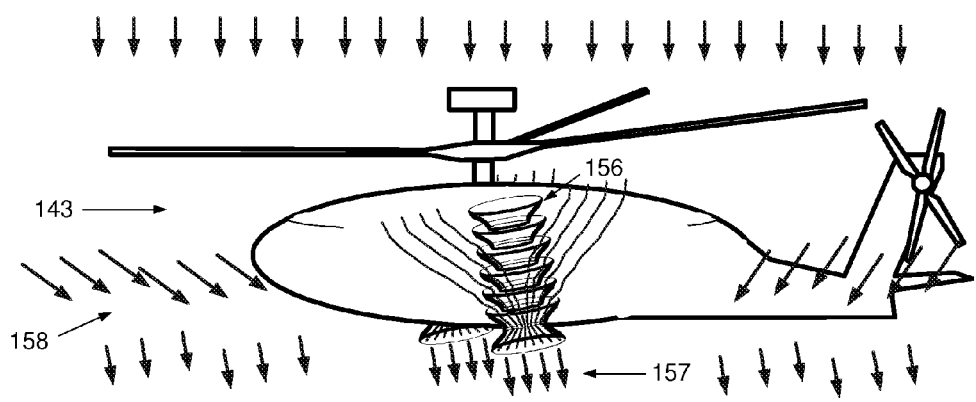
FIG. 15b is a schematic illustration of a helicopter supplied with an attached cascade of converging nozzles, having a degree of freedom to be tilted variably, constructed according to an exemplary embodiment of the present invention.

FIG. 15b is a schematic illustration of helicopter 143 supplied with an attached cascade of converging and diverging nozzles 156 further modified to provide a degree of freedom to be tilted variably, constructed according to an exemplary embodiment of the present invention. Such a degree of freedom provides an improved mobility of helicopter 143 due to diverting downward air streams 157 and 158 from the vertical direction.

DRAWINGS

It should be understood that the hereinafter sketched exemplary embodiments are merely for purposes of illustrating the teachings of the present invention and should in no way be used to unnecessarily narrow the interpretation of or be construed as being exclusively definitive of the scope of the claims which follow. It is anticipated that one of skill in the art will make many alterations, re-combinations and modifications to the embodiments taught herein without departing from the spirit and scope of the claims.

I claim:

1. An ecologically clean water condensation engine, comprising a set of stationary profiled details being exposed to humid wind bringing water-vapors; wherein said details are oriented to act on said humid wind, thereby providing convective acceleration of arriving air portions, accompanied by a decrease in static pressure according to Bernoulli principle and causing said arriving air portions eddying and vortices having an inherent inner gas static pressure decrease; wherein said decrease in static pressure is bonded with a temperature decrease according to the gas state laws;

such that said temperature decrease triggers off condensation of said water-vapors into water-aerosols and drops of dew, and said drops of dew collect upon surfaces of said profiled details, herein said stationary profiled details have at least one of wing-like and wedge-like profiles.

2. The ecologically clean water condensation engine of claim 1, wherein said engine further supplied by at least one wing-like blade, curved in order to redirect and stabilize the natural wind gusts from an incoming direction into alignment with said stationary profiled details orientation.

3. The ecologically clean water condensation engine of claim 1, wherein at least one said profiled detail comprises at least one stationary blade-grip with attached at least one stationary blade, such that said at least one stationary blade forces portions of flowing said humid wind to get a rotation and to proceed on a helical trajectory.

4. An ecologically clean water condensation engine exposed to humid wind bringing water-vapors, said water condensation engine comprises a profiled horn-tube and set of profiled details;

wherein said profiled horn-tube has two open butt-ends, differing in cross-section area at least on 1 percent, wherein said profiled horn-tube is oriented such that said humid wind enters the bigger butt-end of said profiled horn-tube and proceeds to the smaller butt-end, and wherein the narrowing cross-section of said profiled horn-tube forces said humid wind to be reduced in cross-section area and to increase in velocity, said increase being inversely proportional to said reduced cross-section area according to the continuity equation, and, according to Bernoulli's principle, there occurs a reduction in gas static pressure of the accelerated humid wind and an accelerated out-flow, wherein said reduction in static pressure is bonded with a temperature decrease according to the gas state laws;

and further, said out-flow represents a cooled fast flux coming-and-hitting upon said set of profiled details, and wherein said cooled fast flux runs along said profiled details, wherein said profiled details act on said cooled fast flux, thereby causing convective acceleration, eddying and vortices of air portions, wherein said convectively accelerated air portions, eddying and vortices have an inherent inner static pressure decrease, wherein said decrease in static pressure is bonded with a further temperature decrease according to the gas state laws;

such that said temperature decrease triggers off condensation of said water-vapors into water-aerosols and drops of dew and said drops of dew collect upon surfaces of said profiled details.

5. The ecologically clean water condensation engine of claim 4, wherein said profiled details have at least one of wing-like and wedge-like profiles.

6. The ecologically clean water condensation engine of claim 4, wherein at least one said profiled detail is arranged within said horn-tube.

7. The ecologically clean water condensation engine of claim 4, wherein said profiled horn-tube further comprises at least one stationary wing-like blade, such that said at least one stationary wing-like blade forces portions of flowing said humid wind to get a rotation and to proceed on a helical trajectory.

8. The ecologically clean water condensation engine of claim 4, wherein said profiled horn-tube further comprises at least one scaly fragment comprising wing-like scale-details, said wing-like scale-details provide that additional portions of said humid wind enter between adjacent elements of said wing-like scale-details into the inner space of said horn-tube.

9. An ecologically clean wind concentration engine exposed to humid wind bringing water-vapors, said wind concentration engine comprises a cascade of at least two sequentially arranged profiled horn-tubes;

wherein each of said profiled horn-tubes has two open butt-ends differing in the cross-section area at least on 0.5 per cent;

wherein each of said at least two sequentially arranged profiled horn-tubes is oriented such that the direction from said bigger cross-section butt-end to said smaller cross-section butt-end is substantially the same as the direction of said humid wind;

wherein said humid wind comprises the first air stream flowing around the first of said at least two profiled horn-tubes, wherein each previous said profiled horn-tube transforms the previous oncoming air stream into the next said oncoming air stream flowing around the next of said at least two sequentially arranged profiled horn-tubes;

wherein an inner portion is defined for each said profiled horn-tube as a portion of said oncoming air stream, and said inner portion enters said bigger cross-section butt-end of said associated profiled horn-tube; and an outer portion is defined for each said profiled horn-tube as a portion of said oncoming air stream, and said outer portion flows around the outer side of said associated profiled horn-tube;

wherein said inner portion proceeds to said smaller cross-section butt-end within said profiled horn-tube, such that the narrowing cross-section of said profiled horn-tube forces said inner portion to reduce said stream cross-section area and, according to the continuity equation, to increase the velocity of said stream, said increase being inversely proportional to said reduced area of said stream cross-section, thereby forming an inner faster out-flowing stream;

wherein said outer portion proceeds to said smaller cross-section butt-end of said profiled horn-tube in alignment with the outside profile of said profiled horn-tube, whereby forming an outer out-flowing portion of said humid wind stream, and according to the Coanda suction effect drawing forward fresh outer-adjacent air portions of said humid wind, thereby forming an addition fresh out-flowing stream;

such that the tree streams: said inner fast out-flowing stream, said outer out-flowing stream, and said fresh out-flowing stream—together form the next said oncoming air stream, and wherein the two said streams: said inner fast out-flow and said outer out-flow form the next inner portion of said next oncoming air stream, wherein said next inner portion is effectively faster than the previous said inner portion, and said fresh out-flow forms the next said outer portion of said next oncoming air stream;

wherein said inner portion of the last said oncoming air stream, out-flowing from the last of said at least two sequentially arranged profiled horn-tubes, comprises a fast out-flowing air flux;

such that said first oncoming air stream of said humid wind is transformed into said fast out-flowing air flux according to the continuity equation, wherein the static pressure of said fast out-flowing air flux is reduced relatively to the static pressure of said first oncoming air stream according to Bernoulli's principle and the temperature of said fast out-flowing air flux is decreased relatively to the temperature of said first oncoming air stream as said reduction in the static pressure is bonded with said decrease of the temperature according to the gas state laws;

thereby said humid wind flows around said cascade of at least two sequentially arranged profiled horn-tubes and is transformed into said cooled fast out-flowing air flux;

wherein the decreased temperature of said cooled fast out-flowing air flux triggers off condensation of said water-vapors into water-aerosols and drops of dew; such that said drops of dew collect on the inner surfaces of said wind concentration engine.

10. The ecologically clean wind concentration engine of claim 9, wherein at least one of said profiled horn-tubes further has at least one scaly fragment comprising wing-like scale-details, said wing-like scale-details provide that additional portions of flowing said humid wind enter between said wing-like scale-details into the inner space of said at least one of said profiled horn-tubes.

11. The ecologically clean wind concentration engine of claim 9, wherein at least one said profiled horn-tube further comprises at least one stationary wing-like blade, such that said at least one stationary wing-like blade forces portions of flowing said humid wind to get a rotation and to proceed on a helical trajectory.

12. The ecologically clean wind concentration engine of claim 9, wherein said wind concentration engine is attached to an aircraft, wherein said wind is defined as an air stream blowing and flowing around said aircraft.

13. The ecologically clean wind concentration engine of claim 9, further comprising at least one profiled horn-tube having a divergent fragment.

14. The ecologically clean wind concentration engine according to claim 9, wherein said fast out-flowing air flux having said decreased temperature is utilized for blowing around and cooling objects occupying place outside of said wind concentration engine.

15. The ecologically clean water condensation engine exposed to humid wind bringing water-vapors; said water condensation engine comprises the wind concentration engine of claim 9 and a set of profiled details;

wherein said humid wind comprises an oncoming air stream flowing around said wind concentration engine, wherein said oncoming air stream has a cross-section area bigger than the cross-section area of said wind concentration engine; wherein said bigger cross-section area is bigger than said cross-section area of said wind concentration engine at least on 1 percent;

wherein said wind concentration engine sucks said oncoming air stream according to Coanda-effect, thereby forming a fast out-flowing air flux according to the continuity equation, wherein static pressure of said fast out-flowing air flux is reduced relatively to static pressure of said oncoming air stream according to Bernoulli's principle and the temperature of said fast out-flowing air flux is decreased relatively to the temperature of said oncoming air stream according to the gas state laws, wherein said temperature decrease triggers off condensation of said water-vapors into water-aerosols, wherein said cooled fast out-flowing air flux comes-and-hits upon said set of profiled details;

wherein said set of profiled details acts on said cooled fast out-flowing air flux causing convective acceleration of air portions and air portions eddying and vortices, wherein said accelerated air portions and air portions eddying and vortices have an inherent inner gas static pressure decrease; wherein said decrease in static pressure is bonded with a further temperature decrease according to the gas state laws;

said temperature decrease triggers off condensation of said water-vapors into water-aerosols and drops of dew, and such that said drops of dew collect upon surfaces of said profiled details.

16. An ecologically clean water condensation engine exposed to humid wind bringing water-vapors, said water condensation engine comprising:

a cascade of at least two sequentially arranged profiled horn-tubes; and a set of profiled details;

wherein each of said profiled horn-tubes has two open butt-ends differing in the cross-section area at least on 0.5 per cent;

wherein each of said at least two sequentially arranged profiled horn-tubes is oriented such that the direction from said bigger cross-section butt-end to said smaller cross-section butt-end is substantially the same as the direction of said humid wind;

wherein said humid wind comprises the first air stream flowing around the first of said at least two profiled horn-tubes, wherein each previous said profiled horn-tube transforms the previous oncoming air stream into the next said oncoming air stream flowing around the next of said at least two sequentially arranged profiled horn-tubes;

wherein an inner portion is defined for each said profiled horn-tube as a portion of said oncoming air stream, and said inner portion enters said bigger cross-section butt-end of said associated profiled horn-tube; and an outer portion is defined for each said profiled horn-tube as a portion of said oncoming air stream, and said outer portion flows around the outer side of said associated profiled horn-tube;

wherein said inner portion proceeds to said smaller cross-section butt-end within said profiled horn-tube, such that the narrowing cross-section of said profiled horn-tube forces said inner portion to reduce said stream cross-section area and, according to the continuity equation, to increase the velocity of said stream, said increase being inversely proportional to said reduced area of said stream cross-section, thereby forming an inner faster out-flowing stream;

wherein said outer portion proceeds to said smaller cross-section butt-end of said profiled horn-tube in alignment with the outside profile of said profiled horn-tube, whereby forming an outer out-flowing portion of said humid wind stream, and according to the Coanda suction effect drawing forward fresh outer-adjacent air portions of said humid wind, thereby forming an addition fresh out-flowing stream;

such that the tree streams: said inner fast out-flowing stream, said outer out-flowing stream, and said fresh out-flowing stream—together form the next said oncoming air stream, and wherein the two said streams: said inner fast out-flow and said outer out-flow form the next inner portion of said next oncoming air stream, wherein said next inner portion is effectively faster than the previous said inner portion, and said fresh out-flow forms the next said outer portion of said next oncoming air stream;

wherein said inner portion of the last said oncoming air stream, out-flowing from the last of said at least two sequentially arranged profiled horn-tubes, comprises a fast out-flowing air flux;

thereby said first oncoming air stream of said humid wind is transformed into said fast out-flowing air flux according to the continuity equation, wherein the static pressure of said fast out-flowing air flux is reduced relatively to the static pressure of said first oncoming air stream according to Bernoulli's principle and the temperature of said fast out-flowing air flux is decreased relatively to the temperature of said first oncoming air stream as said reduction in the static pressure is bonded with said decrease of the temperature according to the gas state laws;

thereby said humid wind flows around said cascade of at least two sequentially arranged profiled horn-tubes and is transformed into said cooled fast out-flowing air flux;

and such that said cooled fast out-flowing air flux comes-and-hits upon said set of profiled details;

wherein said set of profiled details acts on said cooled fast out-flowing air flux causing convective acceleration of air portions and air portions eddying and vortices, wherein said accelerated air portions and air portions eddying and vortices have an inherent inner gas static pressure decrease; wherein said decrease in static pressure is bonded with a further temperature decrease according to the gas state laws;

said temperature decrease triggers off condensation of said water-vapors into water-aerosols, and such that drops of dew, and such that said drops of dew collect upon surfaces of said profiled details.

17. The ecologically clean water condensation engine of claim 16, wherein said profiled details have at least one of wing-like and wedge-like profiles.

18. The ecologically clean water condensation engine of claim 16, wherein at least one said profiled detail has a round-like profile creating air vortices.

19. The ecologically clean water condensation engine of claim 16, wherein at least one of said profiled horn-tubes further comprises at least one stationary wing-like blade, such that said at least one stationary wing-like blade forces portions of flowing said humid wind to get a rotation and to proceed on a helical trajectory.

20. The ecologically clean water condensation engine of claim 16, wherein at least one of said profiled horn-tubes has at least one scaly fragment comprising wing-like scale-details, such that said scale-details provide additional portions of said humid wind entering between said wing-like scale-details into the inner space of said at least one of said profiled horn-tubes.

21. The ecologically clean water condensation engine of claim 16, wherein said water condensation engine is attached to an aircraft, wherein said wind is defined as an air stream blowing and flowing around said aircraft.

22. The ecologically clean water condensation engine of claim 16, further comprising at least one profiled horn-tube having a divergent fragment.

23. An air stream concentration engine attached to an helicopter and exposed to downward air stream blown by a propeller of said helicopter, wherein said stream concentration engine comprises at least one profiled horn-tube, wherein said profiled horn-tube, having two open butt-ends: inlet and outlet, and having a form of a converging nozzle with varying cross-section area; wherein a throat of said profiled horn-tube is defined as a fragment of said horn-tube having the minimal cross-section area;

wherein said throat minimal cross-section area differs from the cross-section area of said inlet at least on 5 percent, and wherein said at least one profiled horn-tube is oriented such that said oncoming downward air stream enters said inlet and proceeds to said outlet within said profiled horn-tube, wherein said converging cross-section of said profiled horn-tube forces said downward air to reduce in said stream cross-section area, to increase in said stream velocity in inverse proportion to said reduced stream cross-section area according to the continuity equation, and to decrease in gas static pressure of said accelerated downward air according to Bernoulli's principle, wherein said decrease in gas static pressure is bonded with a temperature decrease according to the gas state laws; said temperature decrease triggers off condensation of said water-vapors into water-aerosols and raindrops.

24. The air stream concentration engine of claim 23, further comprising at least one profiled horn-tube having a divergent fragment.

25. The air stream concentration engine of claim 23, wherein said at least one profiled horn-tube further supplied by stationary wing-like blades redirecting said air stream resulting in rotation of said downward air stream, thereby forcing said air stream to proceed on a helical trajectory.

26. The air stream concentration engine of claim 23, wherein said at least one profiled horn-tube further has a degree of freedom to be tilted variably, whereby providing an improved mobility of said helicopter due to diverting said downward air stream from the vertical direction.

* * * * *